United States Patent
Tabata et al.

[11] Patent Number: 5,887,670
[45] Date of Patent: Mar. 30, 1999

[54] VEHICLE POWER TRANSMITTING SYSTEM HAVING DEVICES FOR ELECTRICALLY AND MECHANICALLY DISCONNECTING POWER SOURCE AND VEHICLE DRIVE WHEEL UPON SELECTION OF NEUTRAL STATE

[75] Inventors: Atsushi Tabata, Okazaki; Yutaka Taga, Aichi-ken; Ryuji Ibaraki, Toyota; Hiroshi Hata, Toyota; Tsuyoshi Mikami, Toyota, all of Japan

[73] Assignee: Toyota Jidosha Kabushiki Kaisha, Toyota, Japan

[21] Appl. No.: 856,188

[22] Filed: May 14, 1997

[30] Foreign Application Priority Data

May 16, 1996 [JP] Japan .................................. 8-121671
Jul. 5, 1996 [JP] Japan .................................. 8-176141

[51] Int. Cl.$^6$ ............................................. B60K 6/04
[52] U.S. Cl. .................... 180/65.2; 180/65.1; 180/65.3; 180/65.6
[58] Field of Search ........................ 180/65.1, 65.2, 180/65.3, 65.6

[56] References Cited

U.S. PATENT DOCUMENTS

| | | | |
|---|---|---|---|
| 3,799,284 | 3/1974 | Hender | 180/65 |
| 3,858,674 | 1/1975 | Tabor | 180/65 |
| 3,915,251 | 10/1975 | Kassekert et al. | 180/65 |
| 3,970,163 | 7/1976 | Kinoshita | 180/65 |
| 4,098,144 | 7/1978 | Besel et al. | 180/65 |
| 4,418,777 | 12/1983 | Stockton | 180/65 |
| 4,697,660 | 10/1987 | Wu et al. | 180/65.2 |
| 4,762,191 | 8/1988 | Hagin et al. | 180/65.2 |
| 4,923,025 | 5/1990 | Ellers | 180/65.2 |
| 5,117,931 | 6/1992 | Nishida | 180/65.2 |
| 5,258,651 | 11/1993 | Sherman . | |
| 5,285,111 | 2/1994 | Sherman | 180/65.2 |
| 5,343,970 | 9/1994 | Severinsky | 180/65.2 |
| 5,427,196 | 6/1995 | Yamaguchi et al. | 180/65.2 |
| 5,513,719 | 5/1996 | Moroto et al. | 180/65.6 |
| 5,558,175 | 9/1996 | Sherman | 180/65.6 |
| 5,562,565 | 10/1996 | Moroto et al. | 180/65.6 |
| 5,667,029 | 9/1997 | Urban et al. | 180/65.3 |
| 5,697,466 | 12/1997 | Moroto et al. | 180/65.2 |
| 5,704,440 | 1/1998 | Urban et al. | 180/65.3 |
| 5,722,911 | 3/1998 | Ibaraki et al. | 180/65.3 |

FOREIGN PATENT DOCUMENTS

A-3-273933 12/1991 Japan .
A-7-67208 3/1995 Japan .
A-7-294148 11/1995 Japan .

*Primary Examiner*—D. Glenn Dayoan
*Assistant Examiner*—Clovia Hamilton
*Attorney, Agent, or Firm*—Oliff & Berridge, PLC

[57] ABSTRACT

A power transmitting system for a motor vehicle having a manually operated member for selecting one of operating states of the power transmitting system, which include a neutral state, wherein a power transmitting path between a drive power source and a drive wheel of the motor vehicle is electrically disconnected by a first power disconnecting device, and is mechanically disconnected by a second power disconnecting device which is operated in response to an operation the manually operated member to the neutral state. Also disclosed is a hybrid drive system including a start-up control device operated upon operation of the manually operated member from a non-drive state to a drive state, for controlling the reaction torque of a motor/generator to rise according to one of predetermined rise characteristics which is selected depending upon a vehicle running condition.

20 Claims, 27 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | ○ | ○ | | | −4.550 |
| DRIVE | 1st | ○ | ○ | | | | | | | ○ | | ○ | 3.357 |
| | 2nd | ● | ○ | | | ● | | | ● | ○ | | | 2.180 |
| | 3rd | ○ | ○ | | | | ○ | ○ | | ○ | | | 1.424 |
| | 4th | ○ | ○ | ○ | | | ○ | | | ○ | ○ | | 1.000 |
| | 5th | | ○ | ○ | ○ | | ○ | | | | | | 0.753 |

FIG. 9

| MODE | CLUTCHES | | ENGINE 12 | STORAGE DEVICE 58 | MODE NOMENCLATURE |
| --- | --- | --- | --- | --- | --- |
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

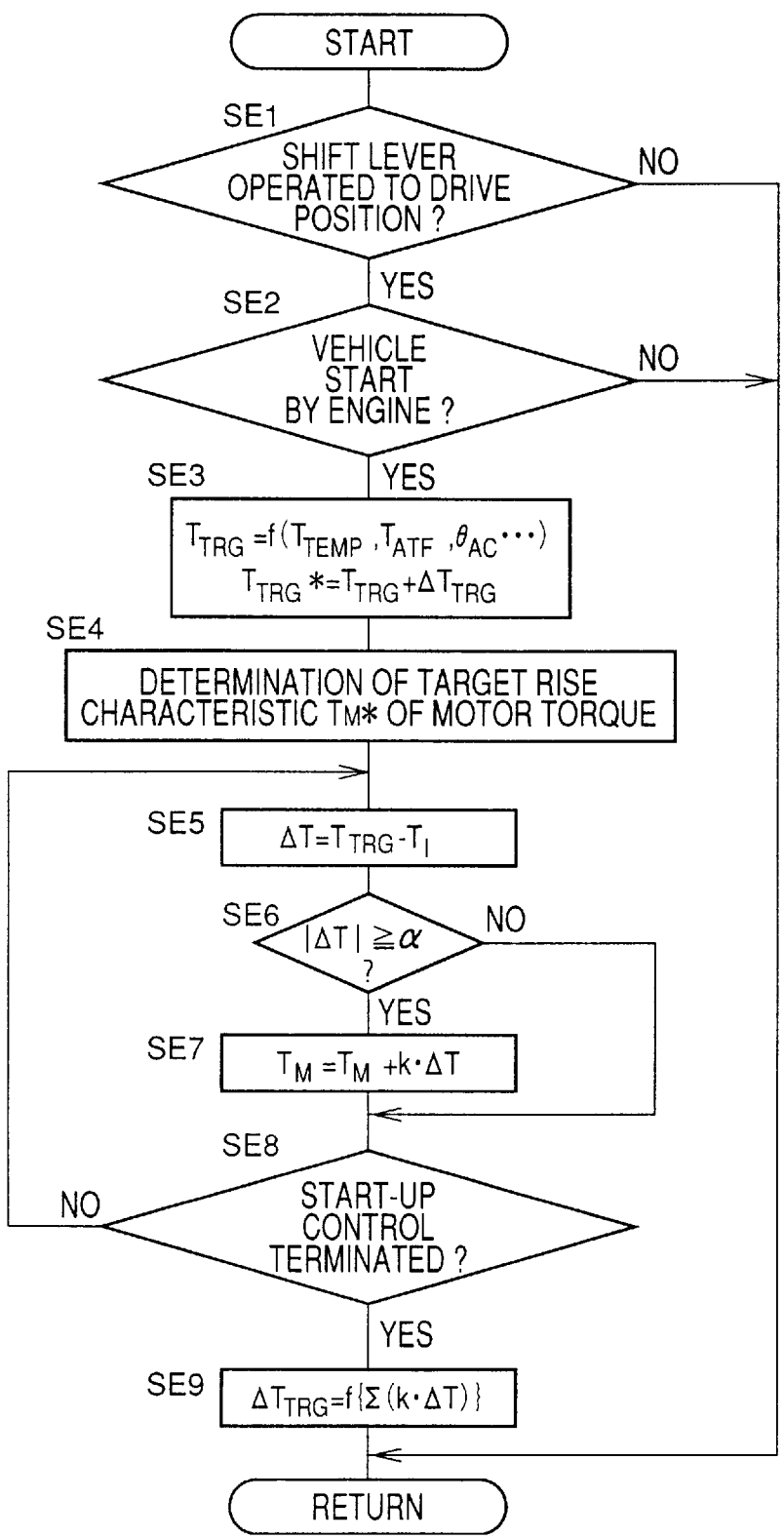

FIG. 20A $T_{ATF}$ 40°C~80°C

| $\theta_{AC}$ \ $T_{TEMP}$ | $0 \leq T_{TEMP} \leq 40°C$ | $40 < T_{TEMP} \leq 80°C$ | $80 < T_{TEMP} \leq 110°C$ |
|---|---|---|---|
| $\theta_1$ | $\Delta T_{TRGA11}$ | $\Delta T_{TRGA21}$ | $\Delta T_{TRGA31}$ |
| $\theta_2$ | $\Delta T_{TRGA12}$ | ⋮ | ⋮ |
| ⋮ | ⋮ | ⋮ | ⋮ |
| $\theta_8$ | $\Delta T_{TRGA18}$ | . . . . | $\Delta T_{TRGA38}$ |

FIG. 20B $T_{ATF}$ 80°C~120°C

| $\theta_{AC}$ \ $T_{TEMP}$ | $0 \leq T_{TEMP} \leq 40°C$ | $40 < T_{TEMP} \leq 80°C$ | $80 < T_{TEMP} \leq 110°C$ |
|---|---|---|---|
| $\theta_1$ | $\Delta T_{TRGB11}$ | $\Delta T_{TRGB21}$ | $\Delta T_{TRGB31}$ |
| $\theta_2$ | $\Delta T_{TRGB12}$ | ⋮ | ⋮ |
| ⋮ | ⋮ | ⋮ | ⋮ |
| $\theta_8$ | $\Delta T_{TRGB18}$ | . . . . | $\Delta T_{TRGB38}$ |

FIG. 24

| | CLUTCH CE1 | CLUTCH 222 | SECOND CLUTCH CE2 | CLUTCH 214 | CLUTCH 216 | CLUTCH 220 | | CLUTCH 218 | |
|---|---|---|---|---|---|---|---|---|---|
| | | | | | | 1 | 3 | 2 | 4 |
| P | | | | | | | | | |
| N | | | | | | | | | |
| E/G R | ○ | ○ | ○ | | | ○ | | | |
| E/G 1 | ○ | | ○ | | | ○ | | | |
| E/G 2 | ○ | | ○ | ○ | | | | ○ | |
| E/G 3 | ○ | | ○ | ○ | ○ | | ○ | | |
| E/G 4 | ○ | | ○ | | ○ | | | | ○ |
| M/G R | | ○ | ○ | | | ○ | | | |
| M/G 1 | | | ○ | | | ○ | | | |
| M/G 2 | | | ○ | ○ | | | | ○ | |
| M/G 3 | | | ○ | ○ | ○ | | ○ | | |
| M/G 4 | | | ○ | | ○ | | | | ○ |
| E/G+M/G R | ○ | ○ | △ | | | ○ | | | |
| E/G+M/G 1 | ○ | | △ | | | ○ | | | |
| E/G+M/G 2 | ○ | | △ | ○ | | | | ○ | |
| E/G+M/G 3 | ○ | | △ | ○ | ○ | | ○ | | |
| E/G+M/G 4 | ○ | | △ | | ○ | | | | ○ |

FIG. 28

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | −4.550 |
| DRIVE | 1st | ○ | | ● | | | ● | | ○ | 3.357 |
| | 2nd | ○ | | | | ○ | | | | 2.180 |
| | 3rd | ○ | | | ○ | | | ○ | | 1.424 |
| | 4th | ○ | ○ | | ○ | | | | | 1.000 |

VEHICLE POWER TRANSMITTING SYSTEM HAVING DEVICES FOR ELECTRICALLY AND MECHANICALLY DISCONNECTING POWER SOURCE AND VEHICLE DRIVE WHEEL UPON SELECTION OF NEUTRAL STATE

This application is based on Japanese Patent Applications No. 8-121671 filed May 16, 1996 and No. 8-176141 filed Jul. 5, 1996, the contents of which are incorporated hereinto by reference.

BACKGROUND OF THE INVENTION

1. Field of the Invention

The present invention relates in general to a power transmission system and a hybrid drive system for a motor vehicle, and more particularly to techniques for controlling a vehicle drive force upon shifting of a power transmitting device from a non-drive position such as a neutral position "N" to a drive position such as a forward drive position "D", and electrically disconnecting a power transmitting path between a drive power source and drive wheels of the vehicle.

2. Discussion of the Related Art

JP-A-7-67208 discloses an example of a known hybrid drive system of a motor vehicle, which is equipped with (a) a drive power source including an engine operated by combustion of a fuel, and a motor/generator, and (b) a power transmitting device such as an automatic transmission interposed between the drive power source and drive wheels of the vehicle. Generally, the power transmitting device has non-drive positions (non-drive state) such as a neutral position "N" and a parking position "P" in which power is not transmitted therethrough from the drive power source to the drive wheels, and drive positions (drive state) such as a forward drive position "D" and a reverse position "R" in which the power is transmitted therethrough. The power transmitting device is electrically or mechanically shifted from one of those operating positions to another, for instance, from one of the non-drive positions to one of the drive positions, by operation of manually operated selecting means such as a shift lever.

There is also proposed a hybrid drive system of a motor vehicle, as disclosed in Japanese Patent Application No. 7-294148 (not published at the time the present invention was made) filed in the name of the assignee of the present application. Such a hybrid drive system includes (a) a synthesizing/distributing mechanism which includes a first rotary element connected to the engine, a second rotary element connected to the motor/generator and a third rotary element connected to an output member, and which is adapted to mechanically synthesize and distribute forces in relation to those rotary elements, (b) electrically neutralizing means for placing the hybrid drive system in an electrically neutral state or mode in which the motor/generator is placed in a non-load state while the above-indicated second rotary element is permitted to freely rotate, for disconnecting a power transmitting path between the engine and the above-indicated output member, when one of the non-drive positions of the power transmitting device is selected by the manually operated selecting means, and (c) start-up control means operated when the power transmitting device is shifted from the non-drive state to the drive state, for gradually increasing a reaction torque of the motor/generator from zero for transmitting the power from the engine to the output member through the synthesizing/distributing mechanism, and wherein the power transmitting device is disposed between the output member of the synthesizing/distributing mechanism and the drive wheels of the motor vehicle. U.S. Pat. No. 5,258,651 discloses a planetary gear device used as the synthesizing/distributing mechanism.

Commonly, such a hybrid drive system is not equipped with a fluid-operated torque converter as provided on an ordinary motor vehicle having an engine as the drive power source and an automatic transmission. Therefore, the hybrid drive system may suffer from a considerable shifting shock or an excessive amount of drive line load, due to an abrupt change in the vehicle drive force upon operation of the manually operated selecting means to shift the power transmitting device from a non-drive state to a drive state. If, for example, the drive position is selected by the selecting means while the engine or the motor/generator is operating with the accelerator pedal being depressed when the power transmitting device is placed in the non-drive state, an excessive load may act on the power transmitting device and other components in the drive line, or the power transmitting device may be subject to a large shifting shock. The hybrid drive system having the synthesizing/distributing mechanism tends to suffer from such an excessive load or shifting shock when the engine is operated at a relatively high speed with the power transmitting device placed in the non-drive state, if the characteristic relating to an increase or rise of the reaction torque of the motor/generator is permanently fixed.

In the hybrid drive system including the synthesizing/distributing mechanism and the electrically neutralizing means as described above, the power transmitting path between the engine and the drive wheels of the vehicle is electrically disconnected. Described more specifically, the operation of the manually operated selecting means to a non-drive position (non-drive state) to electrically neutralize the hybrid drive system is detected by a suitable detector, and a controller commands the electrically neutralizing means to establish the electrically neutral state of the hybrid drive system, in response to an electric signal generated by the detector. To provide mechanical fail-safe means for mechanically disconnecting the power transmitting path upon operation of the selecting means to the non-drive state, a suitable actuator should be provided to mechanically disconnect the power transmitting path between the engine and the drive wheels, upon generation of the electric signal from the detector when the shift lever is operated to the non-drive state. Thus, the mechanical fail-safe means requires such an exclusive actuator and complicate control of the actuator, leading to an increase in the cost of manufacture of the hybrid drive system.

The second power disconnecting means may use suitable clutch means such as frictional coupling clutches, and positive or claw clutches, for mechanically disconnecting the power transmitting power between the drive power source and the vehicle drive wheel. Where the positive clutches are used, each of these clutches is operated by a suitable releasing member such as a hub sleeve which is mechanically connected to the manually operated selecting means such as a shift lever, through connecting means such as a push-pull cable or a linkage. The frictional coupling clutches may be of a hydraulically operated type or a spring type such a diaphragm spring type. Where the frictional coupling clutches of the spring type are used, each of these clutches is operated by a releasing member such as a release fork connected to the manually operated selecting means through suitable connecting means as described above. Where the frictional coupling clutches of the hydraulically operated type are used, each of these clutches is operated by switching of a hydraulic circuit by a manual shift valve which is mechanically connected to the manually operated selecting means through suitable connecting means.

The power source may includes an engine and an electric motor. In this case, the power transmitting system may further comprise an electrically controlled torque converter which includes the electric motor and a planetary gear mechanism. In this instance, the second power disconnecting means may include clutches for disconnecting the power transmitting path between the drive power source and the drive wheels when the manually operated selecting means is operated to the non-drive or neutral state.

While the first power disconnecting means may be adapted to be operated to electrically disconnect the power transmitting path when the manually operated selecting means is operated to the non-drive state, the first power disconnecting means need not be so adapted, since the power transmitting path is mechanically disconnected by the second power disconnecting means when the selecting means is operated to the non-drive state.

Where the power drive source includes an engine and an electric motor, the first power disconnecting means may include means for establishing an electrically neutral state of the power transmitting system in which the electric motor is in a non-load condition with a rotor shaft thereof being freely rotatable, to electrically disconnect the power transmitting path.

SUMMARY OF THE INVENTION

It is a first object of the invention to provide a power transmitting device of a motor vehicle, which can be placed in an electrically neutral state with high reliability upon operation of manually operated selecting means to a non-drive state and which is simple in construction and economical to manufacture.

It is therefore a second object of this invention to provide a hybrid drive system of a motor vehicle, which is adapted to minimize a shifting shock or a drive line load which would take place upon shifting of a power transmitting device from a non-drive state such as a neutral state to a drive state such as a forward drive state.

The first object indicated above may be achieved according to a first aspect of this invention, which provides a power transmitting system for a motor vehicle, comprising: (a) a drive power source for driving the motor vehicle; (b) first power disconnecting means for electrically disconnecting a power transmitting path between the drive power source and a drive wheel of the motor vehicle; (c) manually operated selecting means for selecting one of a plurality of operating states of the power transmitting system, the operating states including a non-drive state; and (d) second power disconnecting means responsive to an operation of the manually operated selecting means to the non-drive state or neutral state, for mechanically disconnecting the power transmitting path.

In the power transmitting system constructed as described above, the second power disconnecting means for mechanically disconnecting the power transmitting path between the drive power source and the drive wheel of the vehicle is provided in addition to the first power disconnecting means for electrically disconnecting the power transmitting path. When the manually operated selecting means is operated to the non-drive state by the vehicle operator, therefore, the power transmitting path is at least mechanically disconnected by the second or mechanical power disconnecting means. The second power disconnecting means is operated to mechanically disconnect the power transmitting path, in response to a mechanical movement of the manually operated selecting means to the non-drive state by the vehicle operator, that is, without a force applied from any exclusive actuator. Therefore, even if the first disconnecting power means for electrically disconnecting the power transmitting path fails to normally function, the power transmitting path can be mechanically disconnected with high reliability and stability, by the second power disconnecting means, which does not require any exclusive actuator or complicated control and which is simple in construction and economical to manufacture.

The first object indicated above may also be achieved according to a second aspect of this invention, which provides a power transmitting system for a motor vehicle, comprising: (a) an engine operated by combustion of a fuel; (b) a motor/generator having a function of at least one of an electric motor and an electric generator, the motor/generator having a rotor shaft; (c) a synthesizing/distributing mechanism for mechanically synthesizing and distributing forces, the synthesizing/distributing mechanism having a first rotary element connected to the engine, a second rotary element connected to the motor/generator, a third rotary element, and an output member from which an output of the synthesizing/distributing mechanism is produced; (d) first power disconnecting means for placing the motor/generator in a non-load condition in which the rotor shaft is freely rotatable, to thereby electrically disconnect a power transmitting path between the engine and the output member; (e) manually operated selecting means for selecting one of a plurality of operating states of the power transmission system, the operating states including a non-drive state; and (f) second power disconnecting means responsive to an operation of the manually operated selecting means to the non-drive neutral state, for mechanically disconnecting the power transmitting path.

The power transmitting system constructed according to the second aspect of the present invention also includes the second power disconnecting means for mechanically disconnecting the power transmitting path between the drive power source and the drive wheel of the vehicle, as well as the first power disconnecting means for electrically disconnecting the power transmitting path. Upon operation of the manually operated selecting means to the non-drive state by the vehicle operator, the power transmitting path is at least mechanically disconnected by the second power disconnecting means. Since the second power disconnecting means is operated to mechanically disconnect the power transmitting path in response to a mechanical movement of the manually operated selecting means to the non-drive state, without a force applied from any exclusive actuator, the power transmitting path can be mechanically disconnected with high reliability and stability by the second power disconnecting means, even if the first disconnecting power means for electrically disconnecting the power transmitting path fails to normally function. The second power disconnecting means does not require any exclusive actuator or complicated control is simple in construction and economical to manufacture.

The engine functions as the drive power source, and the synthesizing/distributing mechanism cooperates with the motor/generator connected thereto to constitute an electrically controlled torque converter, which cooperates with the engine to provide a hybrid drive system. In this hybrid drive system, the first power disconnecting means is arranged to place the motor/generator in the non-load condition to thereby electrically disconnect the power transmitting path between the engine and the vehicle drive wheel. When the first power disconnecting means is not operated, the motor/generator is given a regenerative braking torque or a reverse rotation torque, and the power is transmitted from the engine to the drive wheel, depending upon the torque of the motor/generator. When the manually operated selecting means such as a shift lever is operated to the non-drive state (e.g., neutral or parking position), the second power disconnecting means is operated by a movement of the selecting means to the non-drive state, to mechanically disconnect the power transmitting path. Thus, the power transmitting system according to this second aspect of the invention provides the same advantages as the power transmitting system according to the first aspect of the invention.

In the power transmitting system in the form of the hybrid drive system constructed according to the second aspect of the present invention, the first power disconnecting means preferably include a first clutch for connecting the engine and the first rotary element, and a second clutch for connecting two elements of the first, second and third rotary elements, for rotating the synthesizing/distributing mechanism as a unit. In this case, the first power disconnecting means may be adapted to engage the first clutch and release the second clutch, and to place the motor/generator in the non-load condition, to thereby place the motor/generator in an electrically non-drive state.

The hybrid drive system described above may further comprise a hybrid drive controller. This controller is adapted to release the first clutch and engage the second clutch, to thereby establish a motor drive motor in which the motor/generator is operated as the drive power source for running the motor vehicle. The controller is further adapted to engage the first and second clutches while placing the motor/generator in the non-load condition, to thereby establish an engine drive mode in which the engine is operated as the drive power source for running the motor vehicle. Other clutches or brakes may be provided in addition to the first and second clutches described above, so that the hybrid drive system may be selectively placed in a plurality of operation modes which include one or more operation modes in addition to the motor drive mode and the engine drive modes.

The synthesizing/distributing mechanism preferably include a planetary gear mechanism having a ring gear as the first rotary element, a sun gear as the secondary rotary element, and a carrier as the third rotary element. However, the synthesizing/distributing mechanism may include a bevel gear type differential gear device or other device which has three operatively connected rotary elements which are rotatable relative to each other, for mechanically synthesizing and distributing forces.

The second object indicated above may be achieved according to a third aspect of the present invention, which provides a hybrid drive system for a motor vehicle, comprising: (a) an engine operated by combustion of a fuel; (b) a motor/generator; (c) a synthesizing/distributing mechanism for mechanically synthesizing and distributing forces, the synthesizing/distributing mechanism having a first rotary member connected to the engine, a second rotary member connected to the motor/generator, a third rotary element, and an output member from which an output of the synthesizing/distributing mechanism is produced; (d) manually operated selecting means for selecting one of a non-drive state and a drive state; (e) electrically neutralizing means responsive to an operation of the manually operated selecting means to the non-drive state, for establishing an electrically neutral state of the hybrid drive system in which the motor/generator is in a non-load condition with the second rotary element being freely rotatable, to electrically disconnect a power transmitting path between the engine and the output member; and (f) start-up control means responsive to an operation of the selecting means from the non-drive state to the drive state, for increasing a reaction torque of the motor/generator from zero, to thereby transmit power from the engine to the output member, the start-up control means controlling the reaction torque of the motor/generator 14 to rise according to one of a plurality of predetermined different rise characteristics which is selected depending upon a running condition of the motor vehicle.

In the present hybrid drive system constructed according to the third aspect of the invention described above, the reaction torque of the motor/generator is controlled by the start-up control means, so as to rise according to a selected one of the predetermined different rise characteristics or patterns, so that the torque is produced from the output member of the synthesizing/distributing mechanism, according to the characteristic of rise of the reaction torque of the motor/generator. The rise characteristic is selected, for example, depending upon whether the speed of the engine or motor/generator is higher than a predetermined threshold, as described below. In the present hybrid drive system, the start-up control means makes it possible to minimize or prevent a shifting shock, and prevent an excessive load of the drive line.

The reaction torque of the motor/generator which is controlled to rise by the start-up control means is necessary to permit the torque of the engine to be transmitted to the output member of the synthesizing/distributing mechanism. The direction of rotation of the reaction torque is determined by the relationship of connection of the motor/generator to the synthesizing/distributing mechanism, and the direction of rotation of the output member. For instance, the motor/generator is given the reaction torque for rotation in the same direction as the engine, where the synthesizing/distributing mechanism is a planetary gear device having a ring gear, a sun gear and a carrier which function as the first, second and third rotary elements described above, and where the third rotary element is rotated in the same direction as the first rotary member, namely, in the same direction as the engine. Described in detail, the motor/generator is rotated in the direction opposite to that of the engine when the hybrid drive system is placed in the electrically neutral state. When the motor/generator is rotated in the reverse direction, that is, in the same direction as the engine, the motor/generator is controlled so as to produce a regenerative braking torque until the reverse rotation of the motor/generator is stopped.

In one preferred form of the hybrid drive system according to the third aspect of this invention, the start-up control means is adapted to control the reaction torque of the motor/generator to rise at a lower rate when a speed of the engine or the motor/generator is higher than a predetermined threshold, than when the speed of the engine or the motor/generator is not higher than the threshold.

In another preferred form of the hybrid drive system, the start-up control means is adapted to inhibit a rise of the reaction torque of the motor/generator to rise while a speed of the engine or the motor/generator is higher than a predetermined threshold.

In a further preferred form of the hybrid drive system, the start-up control means is adapted to control the reaction torque of the motor/generator such that an amount of rise of the reaction torque is smaller when a speed of the engine or the motor/generator is higher than a predetermined threshold than when the speed of the engine or the motor/generator is not higher than the threshold.

The preferred forms of the hybrid drive system described above are effective to prevent a shifting shock and an overload of the system due to an inertia of the engine upon changing of the engine speed when the manually operated selecting means is operated to the drive state. The threshold of the speed of the engine or motor/generator is preferably about 5–10 km/h. In the case where the start-up control means is adapted to inhibit the rise of the reaction torque of the motor/generator, it is desirable to effect fuel cut of the engine for reducing the engine speed, irrespective of an operating amount of an accelerator pedal of the vehicle.

In a still further preferred form of hybrid drive system, the drive state selectable by the manually operated selecting means includes a forward drive state and a reverse drive state, and the start-up control means is adapted to select the above-indicated one of the plurality of predetermined different rise characteristics, depending upon whether the manually operated selecting means is operated from the non-drive state to the forward drive state or to the reverse drive state. In this case, the hybrid drive system further comprises power transmitting device disposed between the synthesizing/distributing mechanism and a drive wheel of the motor vehicle, the power transmitting device having a non-drive state which is established to disconnect a power transmitting path between the engine and the drive wheel when the selecting means is operated to the non-drive state, a forward drive state which is established to drive the motor vehicle in a forward direction when the selecting means is operated to the forward drive state, and a reverse drive state which is established to drive the motor vehicle in a reverse direction when the selecting means is operated to the reverse drive state.

In the above preferred form of the hybrid drive system, the reaction torque is controlled to rise according to different rise characteristics or patterns depending upon the forward and reverse drive states selected by the selecting means. For instance, the reaction torque is raised or increased from zero to different values corresponding to the different speed ratios of the forward and reverse drive states of the power transmitting device, so that the drive force values ("creep torque" values) of the motor vehicle in. the forward and reverse positions of the power transmitting device are substantially equal to each other. In this case, the shifting shock is substantially the same irrespective of whether the selecting means is operated to the forward drive state or the reverse drive state.

In a yet further preferred form of the third aspect of this invention, the hybrid drive system further comprises drive mode selecting means for selecting one of a plurality of vehicle drive modes including a low friction coefficient road drive mode in which the vehicle vehicle is run on a road surface whose friction coefficient is lower than a predetermined threshold. In this instance, the start-up control means is adapted to control the reaction torque of the motor/generator such that an amount of rise of the reaction torque is smaller when the low friction coefficient road drive mode is selected by the drive mode selecting means, than when the low friction coefficient road drive mode is not selected. In the present form of the hybrid drive system in which the amount of rise of the reaction torque of the motor/generator is smaller when the road surface has a relatively low friction coefficient, the slipping of the drive wheels upon starting of the motor vehicle can be effectively prevented.

While various arrangements of the start-up control means are employed in the above-described preferred forms of the hybrid drive system, the start-up control means may be adapted to select the rise characteristic of the reaction torque of the motor/generator, depending upon the operating amount of the accelerator pedal, a rate of change of the operating amount of the accelerator pedal, a running speed of the vehicle, and a currently selected one of special vehicle drive modes such as a slope drive mode and a sporty drive mode. The rise characteristic of the reaction torque includes the amount and rate of rise of the reaction torque. The start-up control means is operated not only when the accelerator pedal is depressed, but also when the accelerator pedal is in the non-operated position. In the latter case, the "creep" torque for starting the vehicle with the accelerator pedal placed in the non-operated position can be suitably controlled upon operation of the manually operated selecting means to the drive state.

In still another preferred form of the hybrid drive system, the start-up control means is adapted to control the reaction torque of said motor/generator in a feedback fashion such that a physical value which changes in relation to the reaction torque coincides with a predetermined target value. In this form of the invention, the vehicle drive force is increased to a desired value, without an influence by external disturbances such as a variation in the temperature of the coil of the motor/generator.

In yet another preferred form of the hybrid drive system, the start-up control means is adapted to control the reaction torque of the motor/generator so as to coincide with a target value, which is updated by learning compensation on the basis of a result of control of the reaction torque by the start-up control means.

The above forms of the hybrid drive system adapted to control the reaction torque in the feedback fashion or by utilizing learning compensation of the target value are preferred in the light of a possibility of the motor torque being influenced or changed by the motor coil temperature and other external disturbances, and in the light of a possibility of chronological changes of the motor/generator. For instance, it is desirable to control the reaction torque of the motor/generator in a feed-forward fashion such that the torque or speed of the output member of the synthesizing/distributing mechanism or other physical value which changes with in relation to the reaction torque coincides with a predetermined target value, and control the reaction torque in the feedback fashion on the basis of an error in the feed-forward control. It is further desirable to update the target value of the feed-forward control by a learning compensation technique. The learning compensation is preferably effected by using learning compensation data maps each of each represents a relationship between the learning compensation value and a suitable parameter such as the motor coil temperature, engine torque (as represented by the operating amount of the accelerator pedal), established state of the manually operated selecting means or oil temperature of a power transmitting device such as an automatic transmission. The target value may also be updated by learning compensation on the basis of a suitable parameter associated with the rise of the reaction torque, such as a time required for the rise of the reaction torque.

In a further form of the hybrid drive system, the start-up control means is adapted to control the reaction torque of said motor/generator in a feedback fashion such that a physical value which changes in relation to the reaction torque coincides with a predetermined target value, which is updated by learning compensation.

The target value indicated above may be a predetermined constant value, or may be continuously changed to provide a target pattern of change of the reaction torque or physical value.

The second object indicated above may also be achieved according to a fourth aspect of the present invention, which provides a hybrid drive system for a motor vehicle, comprising: (a) a drive power source for driving the motor vehicle, said drive power source including an engine operated by combustion of a fuel, and a motor/generator; (b) manually operated selecting means for selecting one of a non-drive state and a drive state; (c) power transmitting device disposed between said drive power source and a drive wheel of the motor vehicle, said power transmitting device having a non-drive state which is established to disconnect a power transmitting path between said engine and said drive wheel when said selecting means is operated to said non-drive state, and a drive state which is established to drive the motor vehicle when said selecting means is operated to said drive state; and (d) vehicle drive motor control means responsive to an operation of said manually operated selecting means, for controlling said motor/generator so as to reduce an input speed of said power transmitting device, when said input speed is expected to be higher than a predetermined threshold if the motor/generator is not controlled by the vehicle drive motor control means.

The input speed of the power transmitting device upon operation of the selecting means from the non-drive state to the drive state expected to be higher than the threshold in the following two cases. In the first case, the power is transmitted form the drive power source to an input member (e.g., input shaft) of the power transmitting device even when the selecting means is placed in the non-drive state. In the second case, suitable means such as a clutch is provided to disconnect the power transmitting device from the drive power source when the selecting means is placed in the non-drive state, and the power is transmitted from the drive power source to the power transmitting device when the selecting means is operated from the non-drive state to the drive state. In either of these cases, the input speed of the power transmitting device may exceed the threshold upon operation of the selecting means to the drive state to transmit the power from the drive power source to the input member of the power transmitting device, if the motor/generator were not controlled to reduce the input speed. In the hybrid drive system constructed according to the fourth aspect of the invention, the vehicle drive motor control means is adapted to control the motor/generator so as to reduce the input speed of the power transmitting device, whereby the input speed does not actually exceed the threshold. If the power transmitting device is brought to a drive state prior to the power transfer thereto from the drive power source, in response to the operation of the selecting means to the drive state, the input speed of the power transmitting device is reduced to prevent the actual input speed from exceeding the threshold.

In the hybrid drive system constructed according to the fourth aspect of this invention, the motor/generator is controlled to reduce the input speed of the power transmitting device if the input speed is expected to exceed the predetermined threshold. Therefore, the inertia of the drive power source is reduced by an amount corresponding to an amount of reduction of the input speed, for thereby reducing the shifting shock of the power transmitting device and the load of the drive line upon power transfer from the drive power source to the drive wheel through the power transmitting device.

In one preferred form of the hybrid drive system according to the fourth aspect of the invention, the vehicle drive motor control means is adapted to reduce a torque of the motor/generator when power is transmitted to the power transmitting device on the basis of an output of the motor/generator.

Where the input member of the power transmitting device is rotated on the basis of the output of the motor/generator, the torque of the motor/generator may be reduced. Where the input member is rotated on the basis of the output of the engine, and the motor/generator is rotated in synchronization with the engine, on the other hand, the motor/generator may be given a torque for reverse rotation, or given a regenerative braking torque by controlling the power generation by the motor/generator.

Where the input member of the power transmitting device is rotated by the output of the engine, it is desirable to reduce also the engine output by cutting the fuel supply to the engine. If the electric energy amount stored in an electric energy storage device is not sufficient for operating the motor/generator, the fuel cut of the engine is desired.

The second object indicated above may also be achieved according to a fifth aspect of this invention, which provides a hybrid drive system for a motor vehicle, including: (a) a drive power source for driving the motor vehicle, the drive power source including an engine operated by combustion of a fuel, and a motor/generator; (b) manually operated selecting means for selecting one of a non-drive state and a drive state; (c) power transmitting device disposed between the drive power source and a drive wheel of the motor vehicle, the power transmitting device having a non-drive state which is established to disconnect a power transmitting path between the engine and the drive wheel when the selecting means is operated to the non-drive state, and a drive state which is established to drive the motor vehicle when the selecting means is operated to the drive state; and (d) input restricting means responsive to an operation of the manually operated selecting means, for restricting transmission of power between the drive power source and the power transmitting device, when the input speed is expected to be higher than a predetermined threshold if the the transmission of power is not restricted by the input restricting means.

The concept of "restricting transmission of power between the drive power source and the power transmitting device" is interpreted to include inhibiting the transmission of power between the drive power source and the power transmitting device.

In the above hybrid drive system, the transmission or transfer of power from the drive power source to the power transmitting device is restricted by the input restricting means when the input speed is expected to exceed the predetermined threshold if the input restricting means were not operated. This hybrid drive system according to the fifth aspect of the invention provides substantially the same advantages as the hybrid drive system according to the fourth aspect of the invention described above.

The principles of the fourth and fifth aspects of the invention are applicable to various hybrid drive systems in which the drive power source for driving a motor vehicle includes the engine and the motor/generator. For instance, the hybrid drive system may adapted to select one or both of the engine and the motor/generator as the drive power source, by engaging or releasing clutch means for selectively connecting or disconnecting power transmitting paths. Alternatively, the hybrid drive system may be adapted to use the motor/generator as an auxiliary drive power source for assisting the engine as a primary drive power source. The hybrid drive system may include a synthesizing/distributing mechanism as described above with respect to the third aspect of the invention.

The power transmitting device is preferably an automatic transmission such as a planetary gear device, which has the non-drive state and the drive state (which may consist of two or more drive positions having different speed ratios), which are selectively established by hydraulically operated clutch means or frictional coupling means. However, the power transmitting device may be an infinitely variable transmission or a manually operated transmission. The manually operated selecting means may be a shift lever for mechanically or electrically shifting the power transmitting device.

The fuel cut control of the engine may be effected together with an operation of the input restricting means provided according to the fifth aspect of the invention.

In the fourth and fifth aspects of this invention, the vehicle drive motor control means or the input restricting means is provided to prevent a shifting shock or an overload due to an inertial of the drive power source upon changing of the speed of the engine and/or the speed of the motor/generator when the selecting means is operated to the drive state. Preferably, the vehicle drive motor control means or the input restricting means is adapted to be operated when the input speed of the power transmitting device exceeds a threshold of about 5–10 km/h. Since the inertia differs depending upon whether the vehicle is driven by the engine or the motor/generator, different values are desirably used as the threshold, depending upon the operating state of the drive power source (whether the vehicle is driven by the engine or the motor/generator.

The input restricting means indicated above may include clutch means for disconnecting the power transmitting path between the drive power source and the input member of the power transmitting device. Where the hybrid drive system includes a synthesizing/distributing mechanism as provided in the third aspect of the invention, the input restricting means may be adapted to establish an electrically neutral state of the hybrid drive system in which the motor/generator is in a non-load state. In this case, the input restricting means is adapted to restrict or inhibit the transmission of power between the power transmitting device and the engine and/or the motor/generator which is/are used as the drive power source when the system is in the electrically neutral state.

As described above, the vehicle drive motor control means and the input restricting means are operated when the input speed of the power transmitting device is expected to be higher than the predetermined thresholds. Where the power drive source is connected to the input member of the power transmitting device when the selecting means is placed in the non-drive state, the speed of the input member can be detected as the input speed of the power transmitting device. However, the input speed may be determined on the basis of the speed of the engine or motor/generator. Where the drive power source is disconnected from the power transmitting device when the selecting means is placed in the non-drive state, the input speed is determined on the basis of the speed of the engine or motor/generator.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a view indicating operating states of various coupling elements for establishing different operating positions of the automatic transmission in the hybrid drive system of FIG. 1;

FIG. 9 is a view indicating nine operating modes which are selectively established in the sub-routine of FIG. 7;

FIG. 19 is flow chart illustrating a routine for learning compensation of the motor torque rise characteristic;

FIGS. 20A and 20B are views indicating examples of stored data maps representative of learning compensation values obtained in the routine of FIG. 19;

FIG. 24 is a view indicating a relationship among the operation mode of the hybrid drive system, the operating positions of the automatic transmission and the operating states of clutches;

FIG. 28 is a view indicating the operating states of coupling elements for establishing different operating positions of an automatic transmission in the hybrid drive system of FIG. 27.

DETAILED DESCRIPTION OF THE PREFERRED EMBODIMENTS

Figure 1:
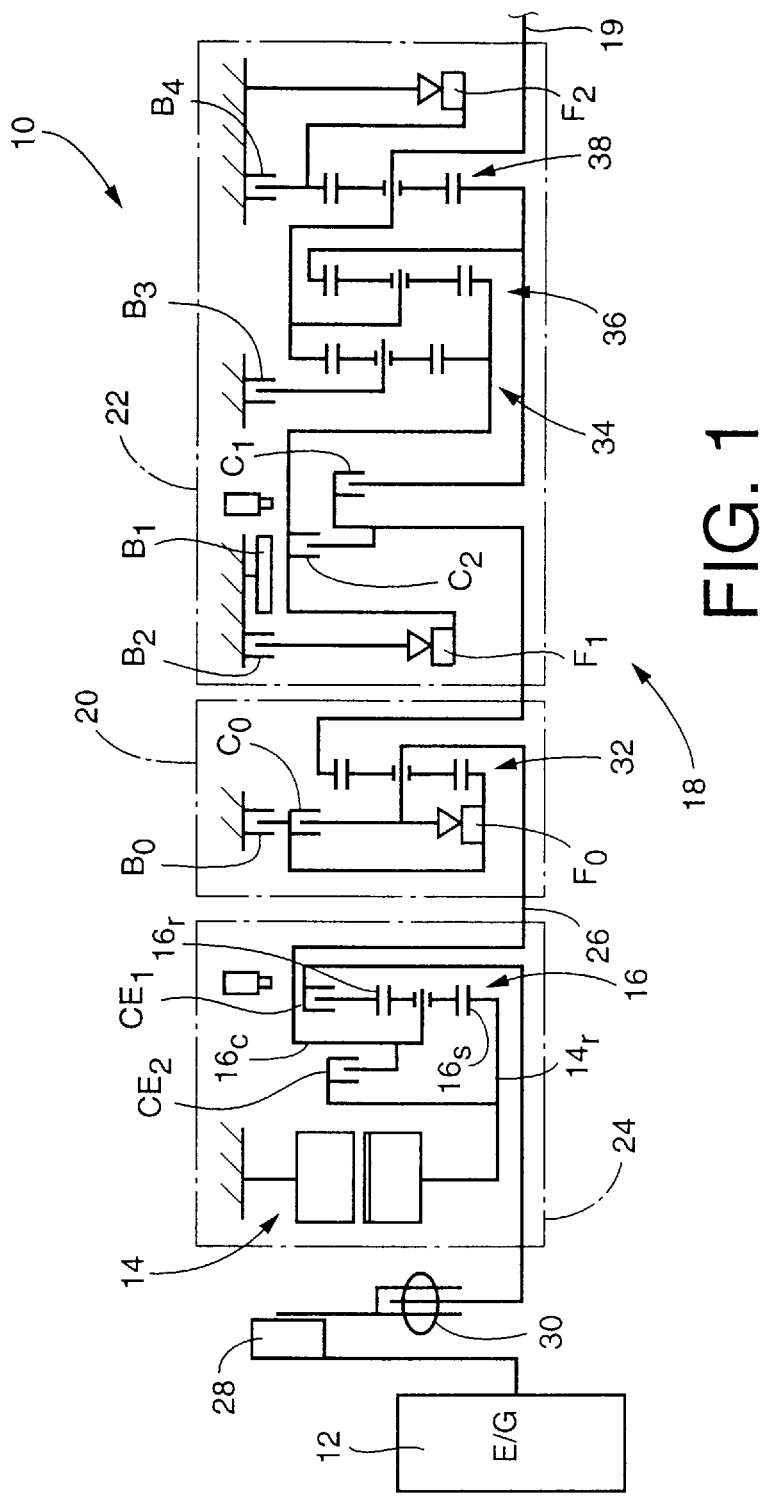
FIG. 1 is a schematic view illustrating a general arrangement of a hybrid drive system constructed according to a first embodiment of the present invention and including a power transmission system with an automatic transmission.

Referring first to the schematic view of FIG. 1, there is shown a hybrid drive system 10 adapted for use on a front-engine rear-drive motor vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing a force, and cooperates with the motor/generator 14 to constitute an electrically controlled torque converter 24 as-indicated in one-dot chain line in FIG. 1. The electrically controlled torque converter 24 functions as first power disconnecting means. The planetary gear device 16 includes: a first rotary element in the form of a ring gear 16$r$ connected to the engine 12 through a first clutch CE1; a second rotary element in the form of a sun gear 16$s$ connected to a rotor shaft 14$r$ of the motor/generator 14; and a third rotary element in the form of carrier 16$c$ connected to an output shaft, which is an input shaft 26 of the automatic transmission 18. The sun gear 16$s$ and carrier 16$c$ are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators. The input shaft 26 not only functions as an input member of the automatic transmission 18, but also functions as an output member of the planetary gear device 16.

The automatic transmission 18, which functions as a power transmitting device, is a combination of a front auxiliary transmission 20 and. a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The automatic transmission 18 functions as a power transmitting device disposed between the drive power source (12, 14) and the drive wheel of the vehicle.

The auxiliary transmission 20 includes frictionally coupling clutch C0 and brake B0 operated by respective hydraulic actuators, and a one-way clutch F0. The primary transmission 22 frictionally coupling clutches C1, C2 and brakes B1, B2, B3, B4 which are operated by respective hydraulic actuators, and one-way clutches F1, F2.

Since the automatic transmission 18 and the electrically controlled torque converter 24 are symmetrical with respect to their centerline, only the upper halves of the transmission 28 and torque converter 24 are shown in FIG. 1.

Figure 2:
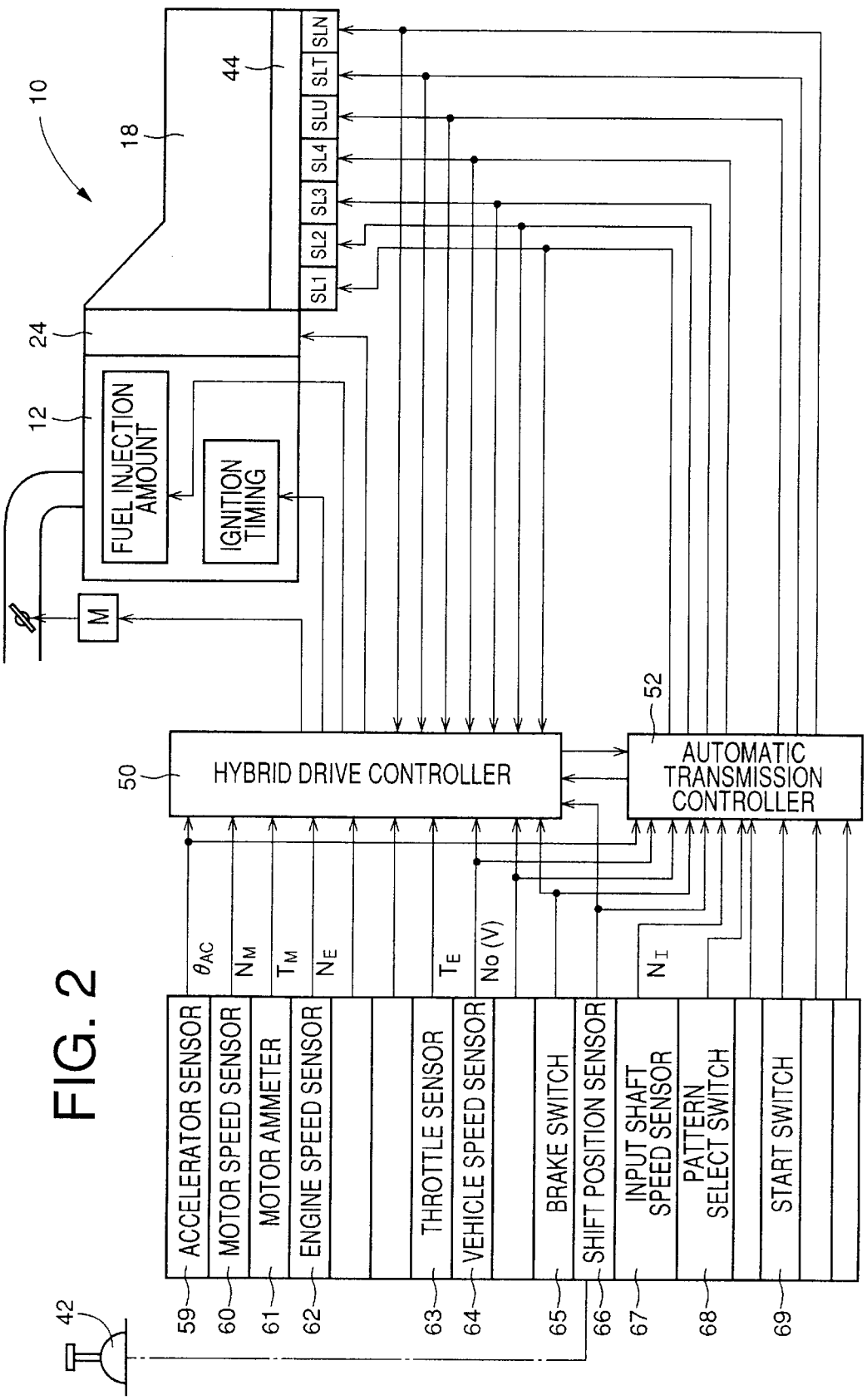
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1 C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve 41 which is mechanically connected through a push-pull cable 43 to a shift lever 42. The clutches C0–C2 and brakes B0–B4 are controlled by the solenoid-operated valves SL1–SL4 and the manual shift valve 41.

The shift lever 42, which functions as manually operated selector means, has a total of eight operating positions, namely, a parking position "P", a neutral position "N", a reverse position "R", a drive position "D", a fourth-drive position "4", a third-speed position "3", a second speed position "2" and a low-speed position "L". The positions "3", "2" and "L" are engine braking positions. When the shift lever 42 is operated to the parking or neutral position "P", "N", the automatic transmission 18 is placed in the corresponding parking or neutral position "P", "N" in which power is not transmitted through the automatic transmission 18. When the shift lever 42 is placed in the drive position "D", the automatic transmission 18 is selectively placed in one of the forward drive positions "1st", "2nd", "3rd", "4th" and "5th" indicated in FIG. 3, for driving the vehicle in the forward direction. When the shift lever 42 is placed in the reverse position "R", the automatic transmission 18 is placed in the rear-drive position "Rev" for driving the vehicle in the rearward direction.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The speed ratios of the five forward-drive positions "1st" through "5th" of the automatic transmission 18 decrease in steps from the speed ratio of the first-speed position "1st" to the speed ratio of the fifth-speed position "5th", as indicated in the table FIG. 3, by way of example only. The fourth-speed position "4th" has a speed ratio $i_4$ which is equal to 1. The planetary gear set 32 of the auxiliary transmission 20 has a gear ratio $\rho$, which is the number of teeth $Z_S$ of the sun gear divided by the number of teeth $Z_R$ of the ring gear. The gear ratio $\rho$ is smaller than 1. The fifth-speed position "5th" has a speed ratio $i_5$ which is equal to $(1/(1+\rho))$. The rear-drive position "R" of the automatic transmission 18 has a speed ratio $i_R$ which is equal to $1-1/\rho_2 \cdot \rho_3$, where $\rho_2$ and $\rho_3$ represent the gear ratios of the planetary gear sets 36, 38, respectively. The speed ratios of the rear-drive and forward-drive positions of the automatic transmission 18 are indicated in the table of FIG. 3, for illustrative purpose only.

Figure 4:
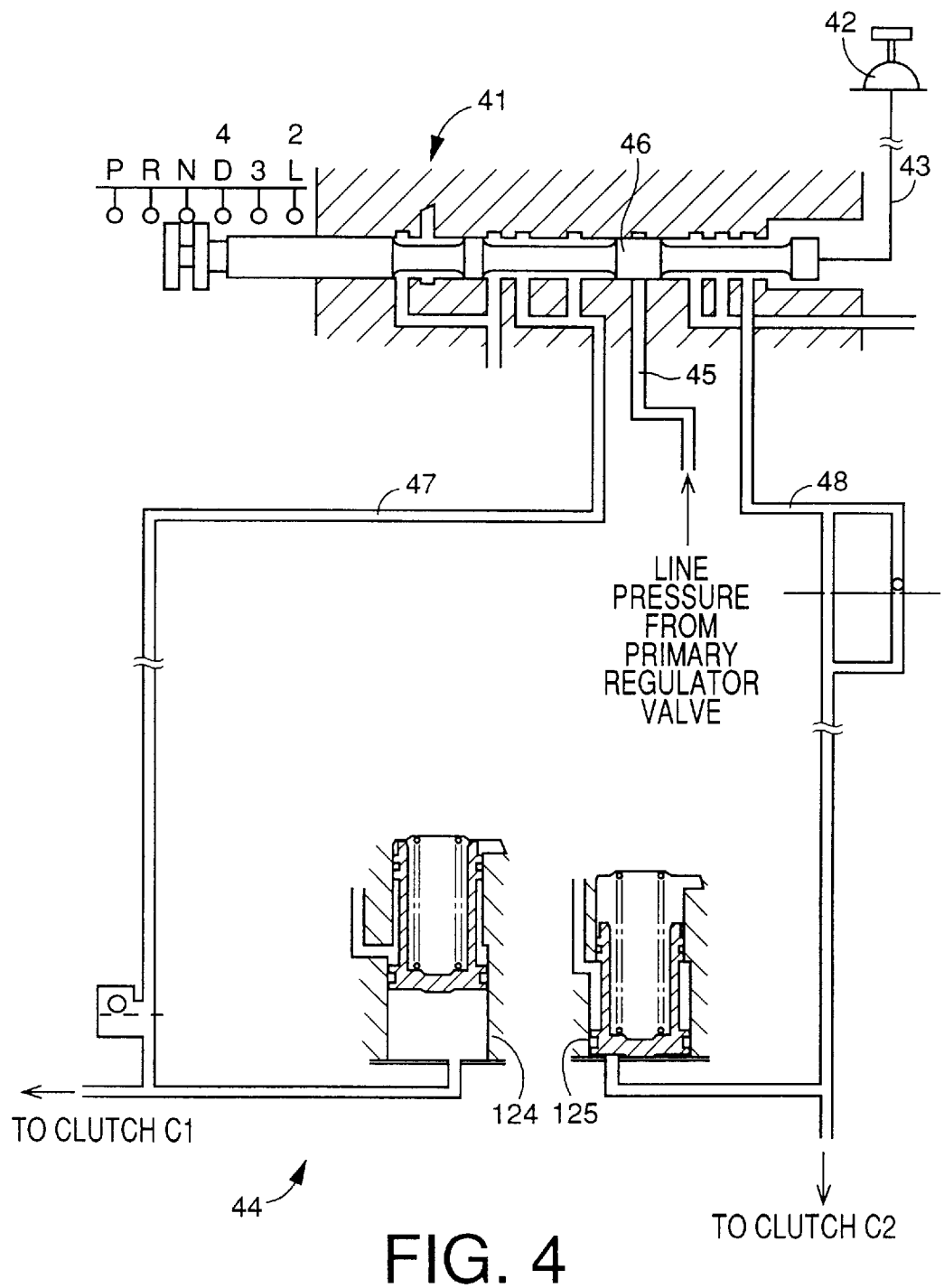
FIG. 4 is a view showing an example of a manual shift valve which is mechanically connected to a shift lever shown in FIG. 2 and which serves as second power disconnecting means.

An example of the manual shift valve 41 mechanically connected to the shift lever 42 is shown in FIG. 4. The manual shift valve 41 receives through a fluid passage 45 a line pressure from a primary regulator valve (not shown). When the shift lever 42 is placed in the neutral or parking position "N", "P", a spool 46 disconnects the fluid passage 45 from a fluid passage 47 and a fluid passage 48, and the fluid is not applied to the clutches C1 C2, whereby the automatic transmission 18 is mechanically placed in the state.

It will be understood that the manual shift valve 41, cable 43 and clutches C1 C2 cooperate to constitute second power disconnecting means for mechanically disconnecting the power transmitting path between the drive power source and the drive wheels, upon operation of the shift lever 42 to the neutral or parking position "N", "P" (non-drive state).

When the shift lever 42 is operated to the drive position "D" or any one of the engine braking positions, the spool 46 is moved to connect the fluid passage 45 to the fluid passage 47, whereby the clutch C1 (forward drive clutch) is activated by the hydraulic pressure to mechanically bring the automatic transmission 18 to a forward drive state. When the shift lever 46 is operated to the reverse position "R", the spool 46 is moved to connect the fluid passage 45 to the fluid passage 48, whereby the clutch C2 (direct drive clutch) is activated by the hydraulic pressure to mechanically bring the automatic transmission 18 to a rear drive state. The clutches C1 C2 are connected to respective accumulators 124, 125.

Figure 5:
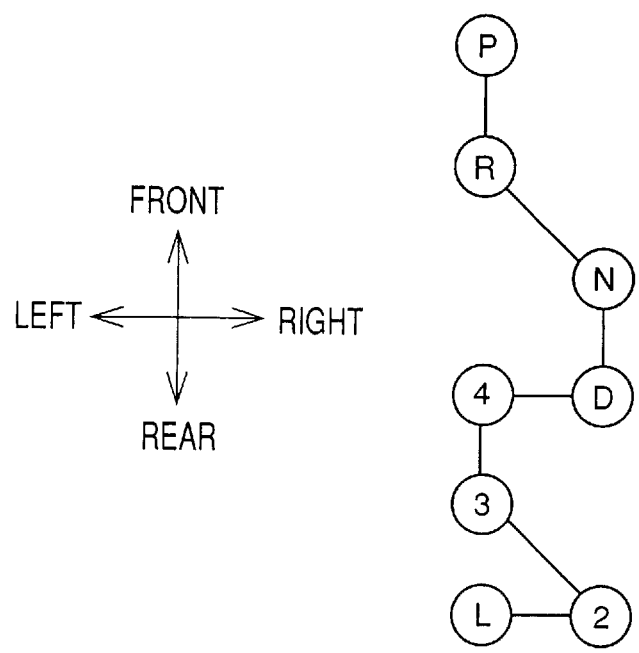
FIG. 5 is a view indicating operating positions of the shift lever.

Referring to FIG. 5, there are shown the operating positions of the shift lever 42. That is, the shift lever 42 has six positions arranged in the longitudinal or running direction of the vehicle, and two positions arranged in the transverse or lateral direction of the vehicle. The shift lever 42 is supported by a suitable support device such that the shift lever 42 is operable to the eight operating positions "P", "N", "R", "D", "4", "3", "2" and "L". The six positions arranged in the longitudinal direction correspond to the six positions of the spool 46 of the manual shift valve 41 indicated in FIG. 4.

The hydraulic control device 44 is constructed as described below by reference to FIG. 6.

Figure 6:
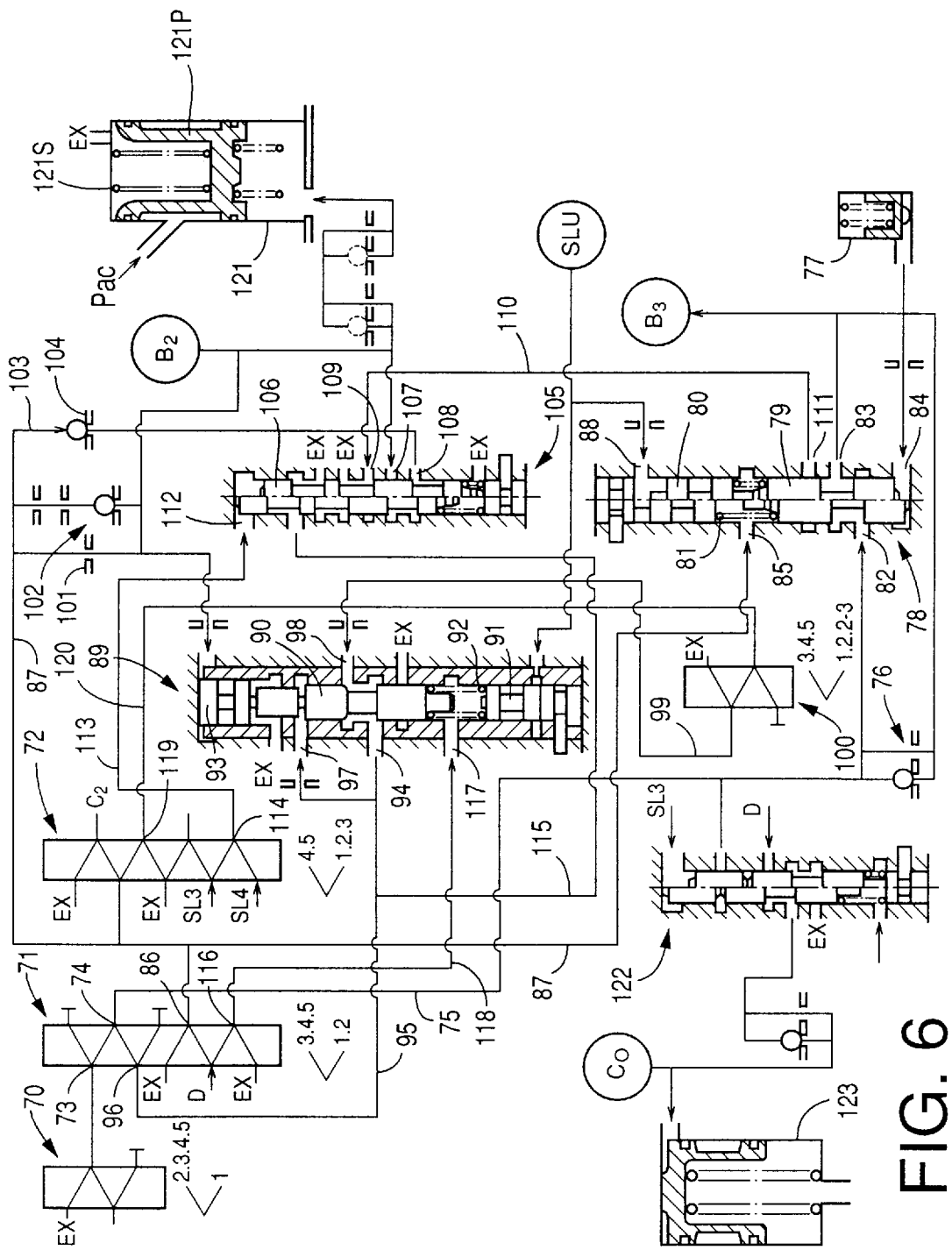
FIG. 6 is a view showing a part of a hydraulic system of the automatic transmission in the hybrid drive system of FIG. 1.

In FIG. 6, reference numerals 70, 71 and 72 denote a 1-2 shift valve, a 2-3 shift valve and a 3-4 shift valve, respectively. Working fluid communications of ports of these shift valves 70, 71, 72 are indicated below the shift valves as shown in FIG. 4 in which the five forward-drive positions "1st", "2nd", "3rd", "4th" and "5th" are represented as "1", "2", "3", "4" and "5", respectively.

The 2-3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 6 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 79 is disposed. The 2-3 shift valve 71 has a port 86 which produces a FORWARD-DRIVE pressure (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 6 denotes a 2-3 timing valve which includes a spool 90, a first plunger 91, a spring 92 disposed between the spool 90 and the first plunger 91, and a second plunger 93 disposed on the side of the spool 90 remote from the first plunger 91. The spool 90 has a small-diameter land and two large-diameter lands having a larger diameter than the small-diameter land. The 2-3 timing valve 89 has a port 94 formed at an intermediate portion thereof. An oil passage 95 is connected to the port 94, and to a port 96 of the 2-3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2-3 timing valve 89, which port 97 is open between the above-indicated small-diameter land one of the two large-diameter lands of the spool 90. The 2-3 timing valve 89 further has a port 98 which is selectively communicable with the above-indicated port 94 and which is connected through an oil passage 99 to a solenoid relay valve 100.

The 2-3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 401 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 6. The above-indicated branch 103 of the oil passage 87 is connected to the port 108. The orifice control valve 105 further has a port 108 formed at a position above the port 107 as seen in FIG. 6.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3-4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position ""5th".

The oil passage 95 has a branch 115 which is connected to the orifice control valve 105. The branch 115 is selectively communicable with the drain port of the orifice control valve 105.

The 2-3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 317 of the 2-3 timing valve 89 which is open to a chamber in which the spring 92 is disposed. The 3-4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 6 denotes an accumulator for the second brake B2. The accumulator 121 has a back-pressure chamber to which is applied an ACCUMULATOR CONTROL pressure Pac which is regulated on the basis of a pilot pressure $P_{SLN}$ received from a linear solenoid valve SLN (FIG. 2). When the 2-3 shift valve 71 is operated to shift up the automatic transmission 18 from the second-speed position "2nd" to the third-speed position "3rd", the second brake B2 receives the FORWARD-DRIVE pressure (line pressure PL) from the port 86 through the oil passage 87, whereby a piston 121p of the accumulator 121 is moved up by this line pressure PL. While the piston 121p is moved up, the hydraulic pressure PB2 applied to the brake B2 is raised to a substantially fixed level corresponding to a sum of the downward biasing force of a spring 121s and a force based on the ACCUMULATOR CONTROL pressure Pac. Precisely, the above-indicated level gradually increases as the spring 121s is compressed. When the piston 121p is moved to its upper end, the pressure PB2 becomes equal to the line pressure PL. That is, the transient pressure PB2 in the process of a 2-3 shifting action of the automatic transmission 18 while the piston 121p is moved up is determined by the ACCUMULATOR CONTROL pressure Pac.

The ACCUMULATOR CONTROL pressure Pac which is applied to the accumulator 121 for the second brake B2 is also applied to the accumulator for the. clutch C1 which is engaged to establish the first-speed position "1st", the accumulator for the clutch C2 which is engaged to establish the fourth-speed position "4th", and the accumulator for the brake B0, which is engaged to establish the fifth-speed position "5th", so that the transient pressures of those clutches C0, C1 and brake B0, are controlled by the ACCUMULATOR CONTROL pressure Pac.

Reference numeral 122 in FIG. 6 denotes a C-O exhaust valve, and reference numeral 123 denotes an accumulator for the clutch C0. The C-O exhaust valve 122 is operated to place the clutch C0 in the engaged state for applying an engine brake to the vehicle when the automatic transmission 18 is shifted to the second-speed position "2nd" while the shift lever is placed in the position "2".

The clutch-to-clutch shift-up action of the automatic transmission 18 from the second-speed position "2nd" to the third-speed position "3rd" is effected by slowly releasing the third brake B3 while at the same time slowly engaging the second brake B2. To effectively reduce a shifting shock upon this clutch-to-clutch shift-up action, the hydraulic pressure of the third brake B3 during its releasing action and the hydraulic pressure of the second brake B2 during its engaging action are suitably regulated by controlling the duty ratio of the linear solenoid valve SLN on the basis of an input torque of the input shaft 26 of the automatic transmission 18. For the other shifting actions of the automatic transmission 18, the transient pressures of the clutches C1 C2 and brake B0, may be regulated by controlling the ACCUMULATOR CONTROL pressure Pac which is regulated by controlling the duty ratio of the linear solenoid valve SLN.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 59 for detecting an operating amount $\theta_{AC}$ of an accelerator pedal; a motor speed sensor 60 for detecting speed $N_M$ of the motor/generator 14; a motor ammeter 61 for detecting an electric current of the motor/generator 14, which indicates torque $T_M$ of the motor 14; an engine speed sensor 62 for detecting speed $N_E$ of the engine 12; a throttle sensor 63 for detecting the opening angle of a throttle valve, which indicates torque $T_E$ of the engine 12; a vehicle speed sensor 64 for detecting speed $N_O$ of the output shaft 19 of the automatic transmission 18, which indicates running speed V of the motor vehicle; a brake switch 65 for detecting an operation of a brake pedal; a shift position sensor 66 for detecting the currently selected position of the shift lever; an input shaft speed sensor 67 for detecting speed $N_I$ of the input shaft 26 of the automatic transmission 18; a MODE SELECT switch 68 for selecting an operation mode of the hybrid drive system 10; and a START switch 69 for starting the hybrid drive system 10.

The torque $T_E$ of the engine 12 can be obtained from the throttle opening angle or the amount of fuel injection into the engine 12.

The hybrid drive controller 50 is adapted to control the opening angle of the throttle valve, and the fuel injection and ignition timing of the engine 12, so that the output of the engine 12 is controlled depending upon the specific running condition of the vehicle.

Figure 7:
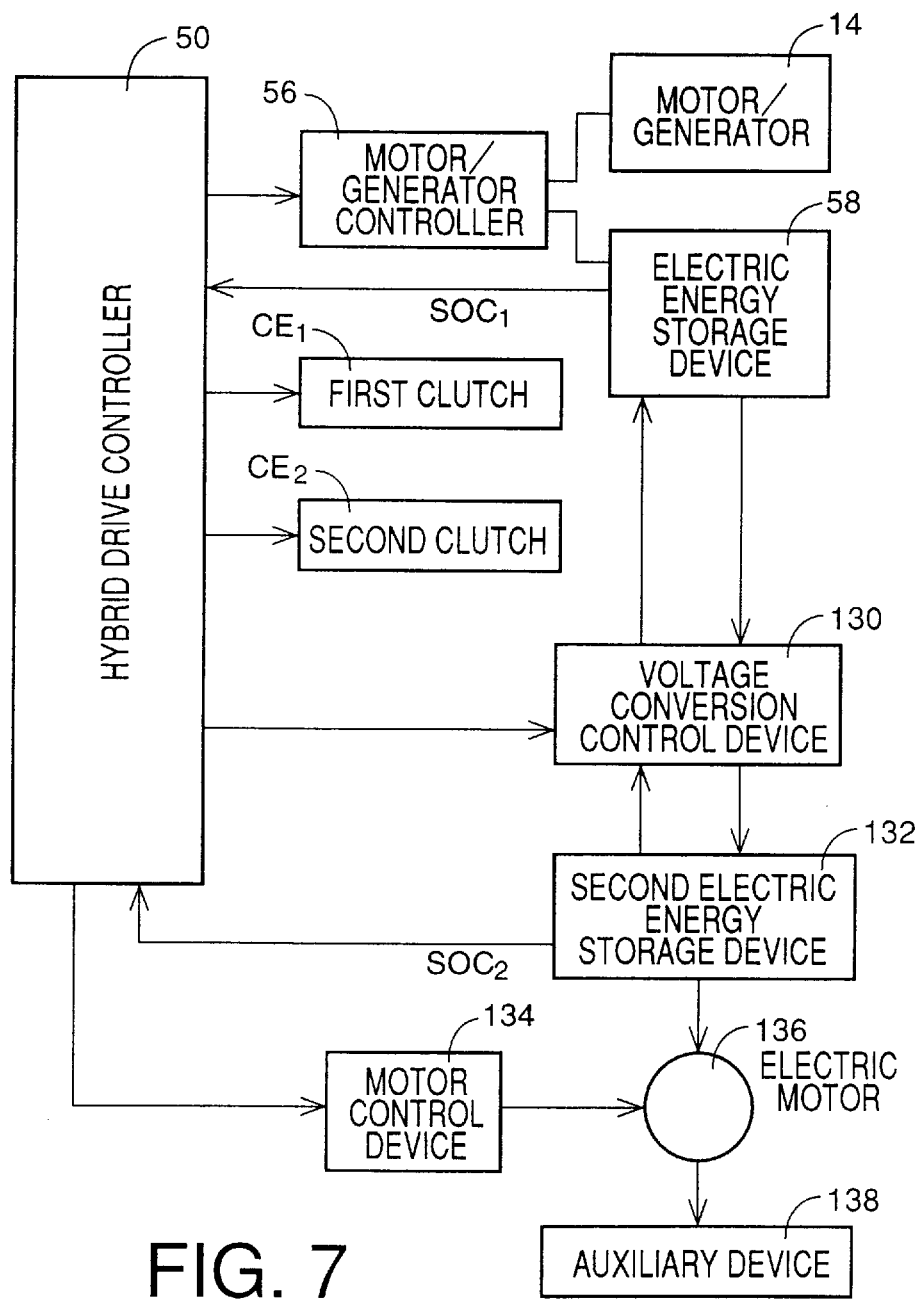
FIG. 7 is a block diagram showing connection between a hybrid drive controller shown in FIG. 2 and an electrically operated torque converter shown in FIG. 1.

The motor/generator 14 is connected to an electric energy storage device 58 through a motor/generator controller 56, as indicated in FIG. 7. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft $14_r$.

An amount of electric energy SOCd stored in the electric energy storage device 58 can be obtained from the electric current or charging efficiency of the motor/generator 14 when it is operated as the electric generator to charge the storage device 58.

The first and second clutches CE1, CE2 are controlled by the hybrid drive controllers 50 through solenoid-operated valves of the hydraulic circuit. The automatic transmission 18 is controlled by the automatic transmission controller 52 through the above-indicated solenoid-operated valves SL1–SL4 and the linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns. The automatic transmission controller 52 functions as shift control means.

A voltage conversion control device 130 is connected to the electric energy storage device 58. This device 130, which may be a chopper circuit, is adapted to convert an electric energy discharged from the storage device 58 into an electric energy of a relatively low voltage to be stored in a second electric energy storage device 132, or to convert an electric energy discharged from the second storage device 132 into an electric energy of a relatively high voltage to be stored in the first storage device 58. The voltage conversion control device 130 is operated under the control of the hybrid drive controller 50.

The hybrid drive controller 50 is adapted to control a motor control device 134, which in turn controls an output of an electric motor 136 which is operated by an electric energy supplied from the second electric energy storage device 133, to drive an auxiliary device 138 such as a compressor of an air conditioner. In the present arrangement, the auxiliary device 70 can be driven by the electric motor 136, irrespective of the operating states of the engine 12 and the motor/generator 14.

Figure 8:
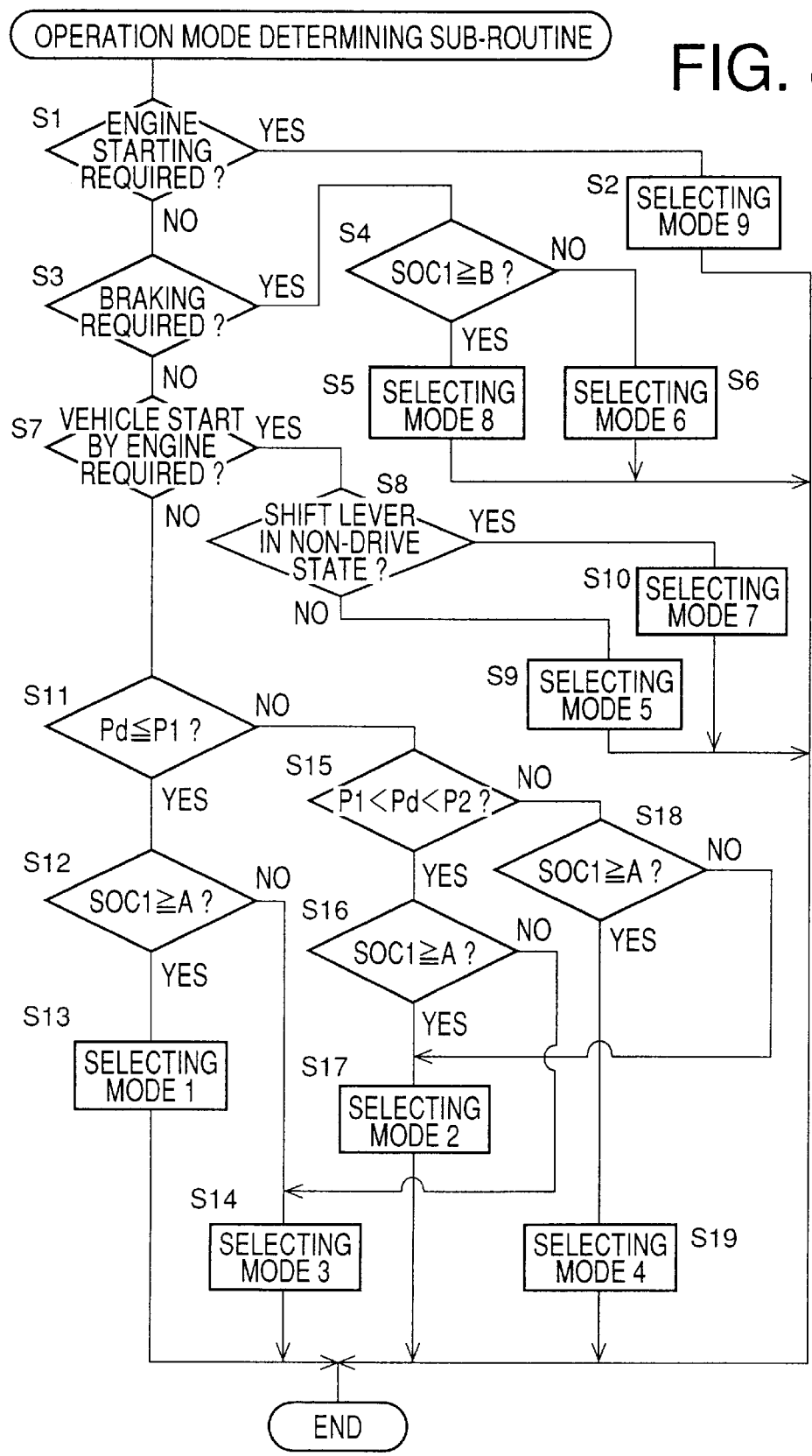
FIG. 8 is a flow chart illustrating an operation mode determining sub-routine executed by the hybrid drive controller.

The hybrid drive controller 50 is adapted to execute an operation mode determining sub-routine illustrated in the flow chart of FIG. 8, for selecting one of nine operation modes of the hybrid drive system 10 indicated in FIG. 9, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 50 is adapted to receive the output signals of the various sensors described above. The hybrid drive controller 50 adapted to execute the operation mode determining sub-routine of FIG. 8 functions as mode selecting means for selecting one of a plurality of operation or running modes of the motor vehicle.

The operation mode determining sub-routine of FIG. 7 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode9, the first and second clutches CE1, CE2 are both engaged (turned ON) as indicated in the table of FIG. 9, and the motor/generator 14 is operated to start the engine 12 through the planetary gear device 16, with the fuel injection amount and other conditions of the engine 10 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14.

Even when the vehicle is running, the engine 12 can be started in the operation mode 9 by temporarily placing the automatic transmission 18 in the neutral position. Thus, the engine 12 can be started by the motor/generator 14. This arrangement eliminates an exclusive starter (e.g., electric motor) for starting the engine 12, whereby the hybrid drive system 10 is available at a reduced cost.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero.

If an affirmative decision (YES) is obtained in step S3, the control flow goes to step S4 to determine whether the amount of electric energy SOC1 stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC1 below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 9, and the motor/generator 14 is placed in the NON-LOAD state. Further, the engine 12 is turned OFF, that is, the throttle valve is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 214 is placed in the NON-LOAD state and permitted to rotate freely in the operation mode 8, the electric energy storage device 58 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 212 is turned OFF, and the motor/generator 14 is placed in the CHARGING state, as indicated in the table of FIG. 9, whereby the motor/generator 14 is driven by a kinetic energy of the motor vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC1 is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in 4 step S7, the control flow goes to step S8 to determine whether the shift lever 42 is placed in a non-drive state (non-drive position), namely, in the parking or neutral position "P", "N". If a negative decision (NO) is obtained in step S8, that is, if the shift lever 42 is not placed in the non-drive position, the control flow goes to step S9 to select an operation mode 5. If an affirmative decision (YES) is obtained in step S8, that is, if the shift lever 42 is placed in the non-drive position "P", "N", the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 9, whereby the vehicle is started by the engine 12, with the regenerative braking torque of the motor/generator 14 being suitably controlled. In this case, the regenerative braking torque is produced to obtain a desired vehicle starting torque ("creep torque") even when the accelerator pedal is not depressed, that is, even when the operating amount $\theta_{AC}$ of the accelerator pedal is substantially zero.

Described in detail, the ratios of the engine torque $T_E$, output torque of the planetary gear device 16 and motor torque $T_M$ are 1:(1+ρE):ρE, where ρE represents a gear ratio of the planetary gear device 16 (ρ=number of teeth of the sun gear 16s divided by number of teeth of the ring gear 16r). When the gear ratio ρE is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as (1+ρE)/ρE times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is (1+ρ) times the engine torque $T_E$.

It will be understood that a portion of the hybrid A. drive controller 50 assigned to implement step S9 to select the operation mode 5 functions as part of start-up control means for increasing a reaction torque of the motor/generator 14 from zero, to transmit power from the engine 12 to the output member 26 of the planetary gear device 16, when the shift lever 42 is operated from the a neutral or parking position "N", "P" (non-drive state) to the drive position "D" (drive state).

The motor/generator 14 used in the hybrid drive system 10 of the present embodiment has a torque capacity which is about ρE times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 9. In this operation mode 7, the output of the carrier 16c is zeroed with the rotor shaft 14r of the motor/generator 214 rotating freely in the reverse direction. When this operation mode 7 is established during running of the vehicle with the engine 12 operated as the drive power source as in the operation mode 2 and mode 3, the stopping of the vehicle does not require the engine 12 to be turned OFF, and the vehicle can be started by the engine 10 as in the operation mode 5.

It will be understood that a portion of the hybrid drive controller 50 assigned to implement step S10 to select the operation mode 7 cooperates with the electrically controlled torque converter 24 to provide first power disconnecting means for electrically disconnecting a power transmitting path between the drive power source and the drive wheels.

In the operation mode 7, the opening angle of the throttle valve is controlled according to the operating amount $\theta_{AC}$ of the accelerator pedal, as in the operation mode 2 (ENGINE DRIVE mode). The engine 12 is operated at the idling speed when the accelerator pedal is in the non-operated position, that is, when the operating amount $\theta_{AC}$ is substantially zero. It will therefore be understood that the portion of the hybrid drive controller 50 assigned to implement step S10 also functions as electrically neutralizing means for placing the hybrid drive system 10 in an electrically neutral state when the shift lever 42 is operated to the neutral or parking position "N", "P". In the electrically neutral state, the motor/generator 14 is placed in the NON-LOAD state, and the rotor shaft 14r is freely rotatable.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC1 is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC1 above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 9, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC1 stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC1 falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 9, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC1 is equal to or larger than the above-indicated predetermined lower limit A. If an affirmative decision (YES) is obtained in step S16, the control flow goes to step S17 to select an operation mode 2.

If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC1 is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 9, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 9, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC1 is equal to or larger than the lower limit A, the electric energy storage device 58 is protected from excessive energy consumption with the stored energy amount SOC1 falling below the lower limit A, which would result in deterioration of the charging and discharging efficiencies of the storage device 58.

As described above, the operation modes 1–4 are selected in the following running states of the vehicle. When the electric energy amount SOC1 stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC1 is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC1 is not smaller than the lower limit A; and 2) when the vehicle is in the high-load running state wherein the currently required output Pd is equal to or larger than the second threshold P2, while the stored electric energy amount SOC1 is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC1 stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC1 below the lower limit A.

As indicated above, the hybrid drive controller 50 adapted to implement step S10 of the operation mode determining sub-routine of FIG. 8 for establishing the electrically neutral mode or state (operation mode 7) of the hybrid drive system 10 (more precisely, of the electrically controlled torque converter 24) cooperates with the electrically controlled torque converter 24 to provide the first power disconnecting means for electrically disconnecting a power transmitting path between the drive power source (12, 14) and the drive wheels. In addition, the manual shift valve 41, cable 43 and first and second clutches C1 C2 cooperate to provide the second power disconnecting means for mechanically disconnecting the power transmitting path, upon operation of the shift lever 42 to the non-drive state or position (e.g., (neutral position "N" or parking position "P"). The manual shift valve 41 is operated to disconnect the power transmission path to prevent power transmission from the engine 12 to the drive wheels, by a mechanical movement of the shift lever 42 to the neutral state (neutral or parking position "N", "P") by the vehicle operator, that is, without a force applied from any exclusive actuator. Therefore, even if the first disconnecting power means for electrically disconnecting the power transmitting path fails to normally function, the power transmitting path can be mechanically disconnected with high reliability and stability, by the second power disconnecting means, which does not require any exclusive actuator or complicated control and which is simple in construction and economical to manufacture.

In the present hybrid drive system 10, the first clutch C1 is placed in the released state when the shift lever 42 is placed in the neutral or parking position IN", "P". In this arrangement, the electric energy storage device 58 can be charged while the vehicle is stopped or parked, if the stored energy amount SOC1 is insufficient. The flow chart of FIG. 10 illustrates a charging routine for charging the storage device 58.

Figure 10:
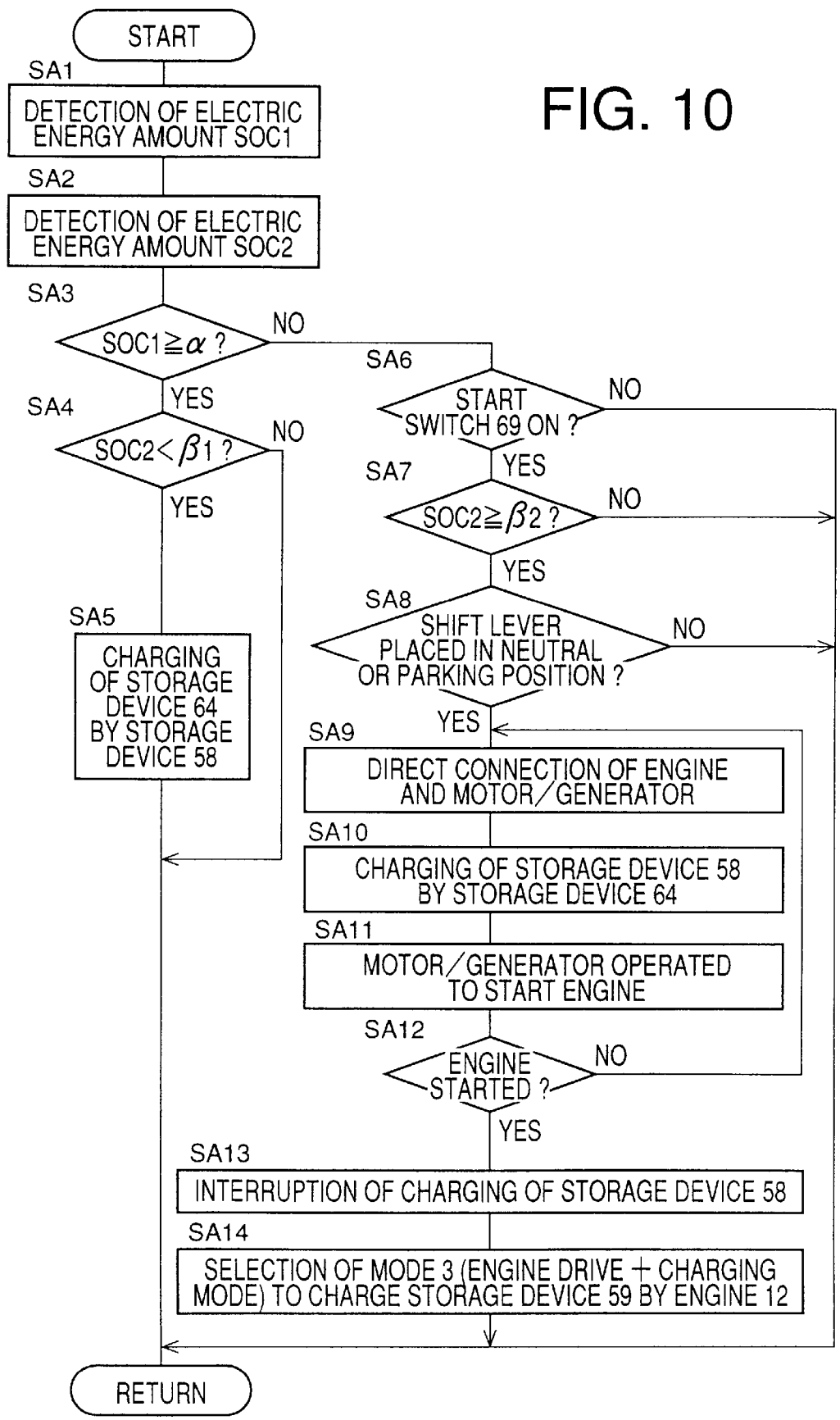
FIG. 10 is a flow chart illustrating a charging routine for charging electrical energy storage devices provided in the hybrid drive system of FIG. 1.

The charging routine of FIG. 10 is initiated with step SA1 to detect the electric energy amount SOC1 stored in the electric energy storage device 58. Step SA1 is followed by step SA2 to detect the electric energy amount SOC2 stored in the second electric energy storage device 132.

Then, the control flow goes to step SA3 to determine whether the stored electric energy amount SOC1 is equal to or larger than a predetermined threshold $\alpha$, which may be the lower limit A indicated above. If an affirmative decision (YES) is obtained in step SA3, the control flow goes to step SA4 to determine whether the electric energy amount SOC2 stored in the electric energy storage device 132 is smaller than a predetermined threshold $\beta 1$, which is a lower limit above which the electric energy stored in the storage device 132 can be used to operate the electric motor 136. The threshold $\beta 1$ is determined depending upon the charging and discharging efficiencies of the storage device 132.

If an affirmative decision (YES) is obtained step SA4, the control flow goes to step SA5 in which the voltage conversion control means 130 converts the electric energy discharged from the storage device 58 into an energy of a relatively low voltage, and supplies the low voltage energy to the storage device 132, under the control of the hybrid drive controller 50, whereby the storage device 132 is charged.

If a negative decision (NO) is obtained in step SA4, it means that the electric energy stored in the storage device 132 can be used to operate the electric motor 136. In this case, one cycle of execution of the routine of FIG. 10 is terminated.

If a negative decision (NO) is obtained in step SA3, on the other hand, the control flow goes to step SA6 to determine whether the START switch 69 (FIG. 2) is in the ON state. The START switch has a function similar to an ignition switch provided on an ordinary motor vehicle driven by an engine. The determination in step SA6 is effected on the basis of an output signal of the START switch 69. It is noted that the ON state of the START switch 69 does not necessarily mean that the engine 12 has been started, but means that the vehicle is enabled to start with suitable operations of the shift lever 42 and the accelerator pedal.

If a negative decision (NO) is obtained, one cycle of execution of the routine is terminated. If an affirmative decision (YES) is obtained in step SA6, the control flow goes to step SA7 to determine whether the electric energy amount SOC2 is equal to or larger than a predetermined threshold $\beta 2$, which is a lower limit above which the electric energy stored in the storage device 132 can be used to charge the storage device 58 for operating the motor/generator 14. The threshold $\beta 2$ is suitably determined by experiments.

If a negative decision (NO) is obtained in step SA7, one cycle of execution of the routine is terminated. If an affirmative decision (YES) is obtained in step SA7, the control flow goes to step SA8 to determine whether the shift lever 42 is placed in the neutral or parking position "N", "P". This determination is effected on the basis of an output signal of the shift position sensor 66.

If a negative decision (NO) is obtained in step SA8, one cycle of execution of the routine is terminated. If an affirmative decision (YES) is obtained in step SA8, the control flow goes to step SA9 in which the first and second clutches CE1, CE2 are engaged (turned ON) to directly connect the engine 12 and the motor/generator 14.

Then, the control flow goes to step SA10 in which the voltage conversion control device 130 converts the electric energy discharged from the storage device 132 into an electric energy of a relatively high voltage, and supplies the high voltage energy to the storage device 58, under the control of the hybrid drive controller 50, whereby the storage device 58 is charged by the storage device 132.

Step SA10 is followed by step SA11 in which the motor/generator 14 is operated by the electric energy supplied form the storage device 58, to start the engine 12 with the fuel injection amount being suitable controlled. Then, step SA12 is implemented to determine whether the engine 12 has been started. This determination is effected on the basis of the output signal of the engine speed sensor 62.

If a negative decision (NO) is obtained in step SA12, the control flow returns to step SA9. Steps SA9 through SA12 are repeatedly implemented until an affirmative decision (YES) is obtained in step SA12. If the affirmative decision (YES) is obtained in step SA12, the control flow goes to step SA13 to interrupt the charging of the storage device 58 by the storage device 64.

Step SA13 is followed by step SA14 in which the operation mode 3 (ENGINE DRIVE+CHARGING mode) is established to operate the engine 12 to operate the motor/generator 14 as an electric generator, for charging the storage device 58. In this case, the shift lever 42 is placed in the parking or neutral position "P", "N", and the automatic transmission 18 is placed in the neutral position "N", so that the vehicle is not driven.

In the present embodiment described above, even when the electric energy amount SOC1 stored in the storage device 58 is smaller than the threshold $\alpha$, the engine 12 can be started by operation of the motor/generator 14 with the electric energy supplied from the storage device 58, since the storage device 58 is charged with the electric energy supplied from the second storage device 132 provided for operating the auxiliary device 138 such as an air conditioner compressor.

After the engine 12 has been started, the operation mode 3 is established to operate the engine 12 to operate the motor/generator for charging the storage device 58, so that the storage device 58 can be efficiently charged in a short time.

The present embodiment is further adapted to charge the storage device 132 provided for the auxiliary device 138, by the storage device 58 through the voltage conversion control device 132, in the case where the electric energy amount SOC2 stored in the storage device 132 is smaller than the threshold $\beta 1$ while the electric energy amount SOC1 stored in the storage device 58 is not smaller than the threshold $\alpha$. Therefore, the auxiliary device 138 can be operated even where the electric energy amount SOC2 has been considerably reduced.

Figure 11:
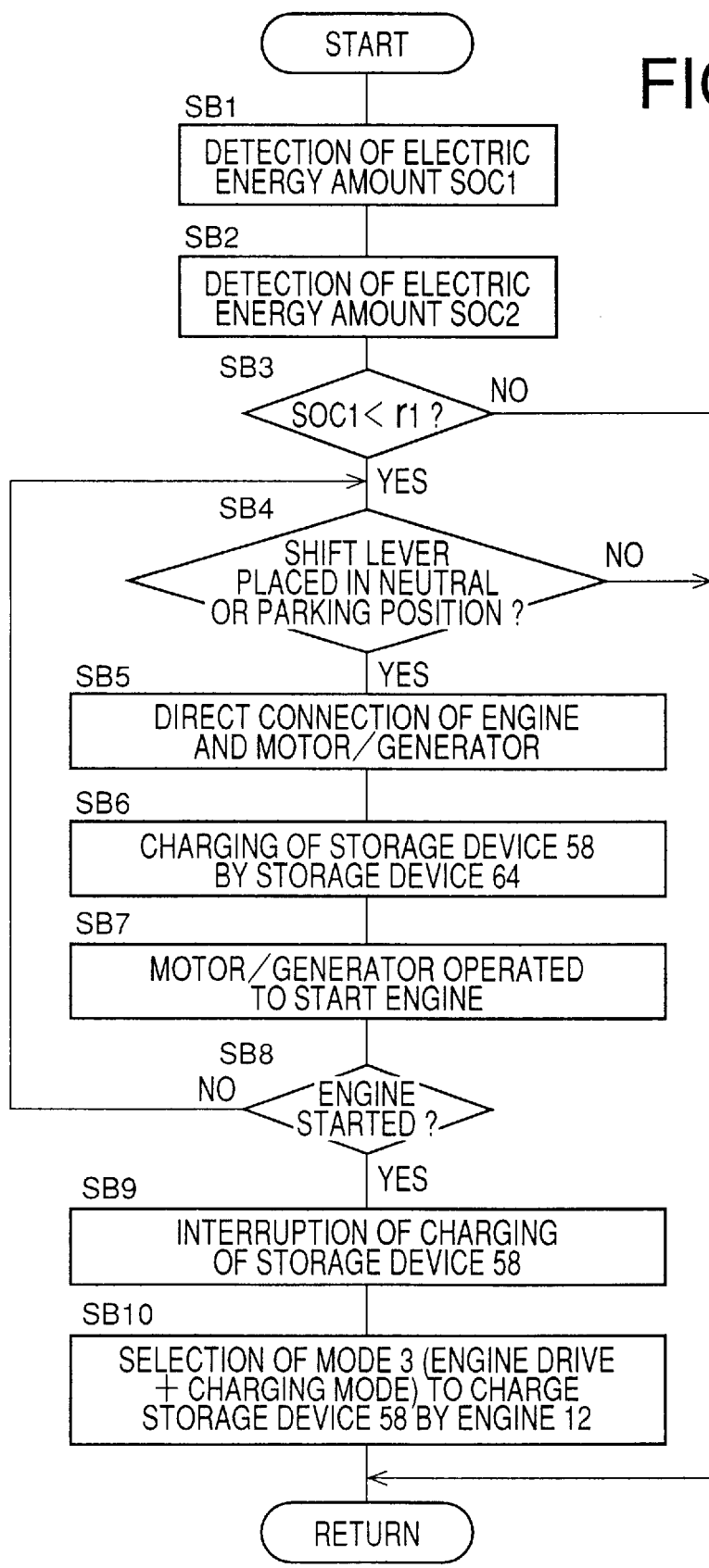
FIG. 11 is a flow chart illustrating a charging routine alternative to the charging routine of FIG. 10.

While the charging routine of FIG. 10 is adapted to charge the storage device 132 by the storage device 58, as well as charge the storage device 58 by the storage device 132, the routine of FIG. 10 may be replaced by a charging routine illustrated in the flow chart of FIG. 11, which is adapted to charge only the storage device 58 by the storage device 132. The routine of FIG. 11 is initiated with steps SB1 and SB2 to detect whether the electric energy amount SOC1 and the electric energy amount SOC2.

Then, step SB3 is implemented to determine whether the electric energy amount SOC1 is smaller than a predetermined threshold $\gamma 1$, which corresponds to the threshold $\alpha$. If a negative decision (NO) is obtained in step SB3, one cycle of execution of the routine of FIG. 11 is terminated. If an affirmative decision (YES) is obtained in step SB3, the control flow goes to step SB4 to determine whether the shift lever 42 is placed in the neutral or parking position "N", "P1". This determination is effected on the basis of the output signal of the shift position sensor 66.

If a negative decision (NO) is obtained in step SB4, one cycle of execution of the routine is terminated. If an affirmative decision (YES) is obtained in step SB4, the control flow goes to step SB5 in which the first and second clutches CE1, CE2 are engaged (turned ON) to directly connect the engine 12 and the motor/generator 14.

Steps SB5 is followed by step SB6 in which the voltage conversion control device 130 converts the electric energy of the storage device 132 into a high voltage electric energy and supplies the high voltage electric energy to the storage device 58, under the control of the hybrid drive controller 50, whereby the storage device 58 is charged.

Then, step SB7 is implemented to operate the motor/generator 14 by the electric energy supplied from the storage device 58, to start the engine 12 with the fuel injection amount being suitably controlled. Then, step SB8 is implemented to determine whether the engine 12 has been started. This determination is effected on the basis of the output signal of the engine speed sensor 62.

If a negative decision (NO) is obtained in step SB8, the control flow goes back to step SB4. Steps SB4 through SB8 are repeatedly implemented until an affirmative decision (YES) is obtained in step SB8. If the affirmative decision is obtained in step SB8, the control flow goes to step SB9 to interrupt the charging of the storage device 58 by the storage device 132.

The control flow then goes to step SB10 to establish the operation mode 3 to operate the engine 12 to operate the motor/generator 14 as an electric generator for charging the storage device 58.

In the present arrangement of FIG. 11, too, the storage device 58 is charged with the electric energy supplied from the storage device 132 provided for the auxiliary device 138, when the electric energy amount SOC1 stored in the storage device 58 is smaller than the threshold γ1. Therefore, the engine 12 can be started by operation of the motor/generator 14 with the electric energy supplied from the storage device 58, even when the electric energy amount SOC1 has been considerably reduced. After the engine 12 has been started, the operation mode 3 is established to operate the engine 12 to operate the motor/generator for charging the storage device 58, so that the storage device 58 can be efficiently charged in a short time.

Figure 12:
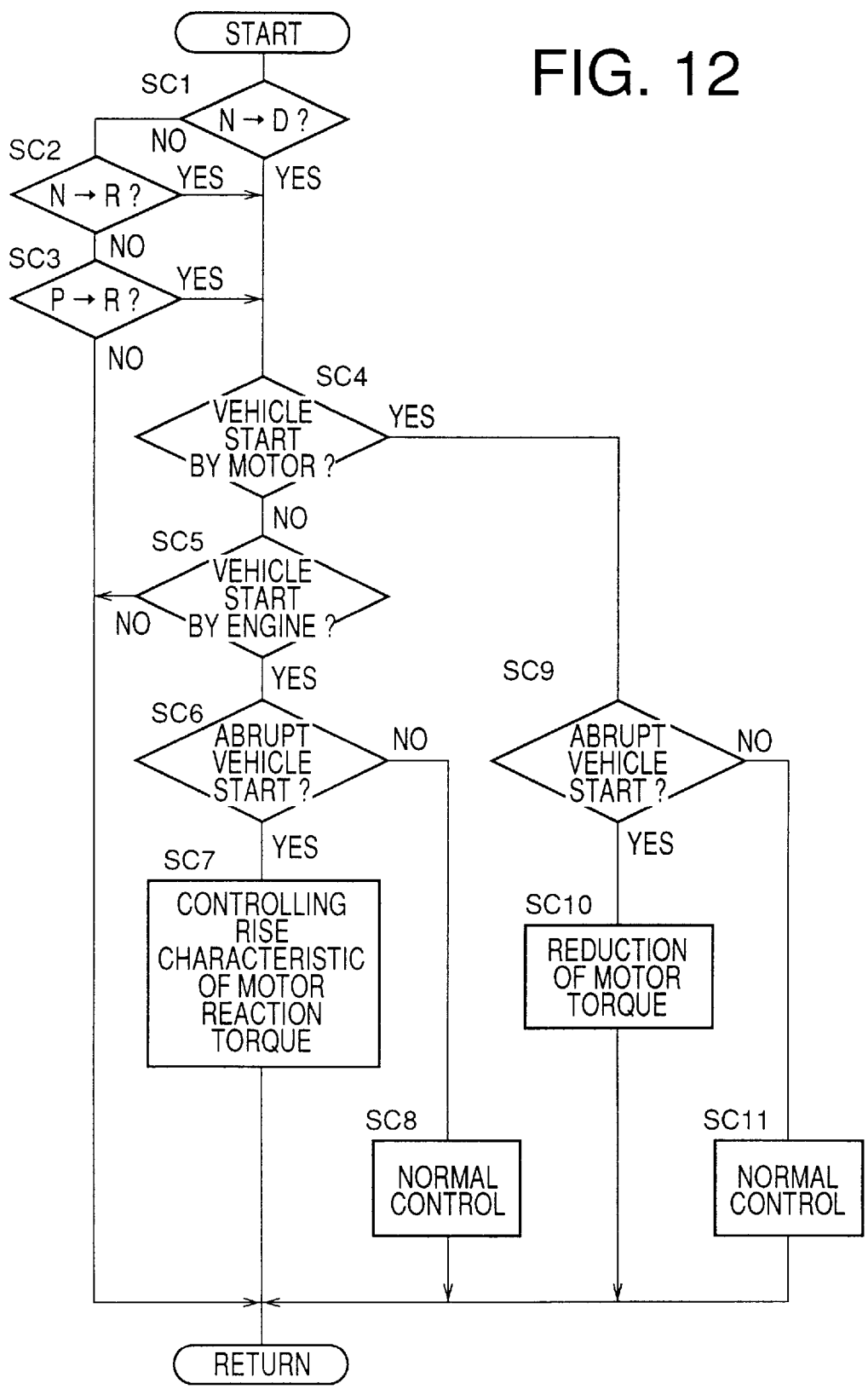
FIG. 12 is a flow chart illustrating a start-up control routine executed by the hybrid drive controller.

The hybrid drive controller 50 is also adapted to execute a start-up control routine illustrated in the flow chart of FIG. 12, when the shift lever 42 is operated from a neutral or parking position "N", "P" (non-drive position or state) to a drive position "D"(drive state). It will be understood that the portion of the hybrid drive controller 50 assigned to implement steps SC6–SC8 cooperates with the portion of the controller 50 assigned to implement step S9 of FIG. 8 to constitute start-up control means for increasing a reaction torque of the motor/generator 14 from zero to permit power to be transmitted from the engine to the output member 26 through the synthesizing/distributing mechanism 16 in the form of the planetary gear device 16, when the shift lever 42 is operated from the neutral or parking position to the drive position "D". It will also be understood that the portion of the controller 50 assigned to implement steps SC9 and SC10 constitute vehicle drive motor control means for controlling the motor/generator 14 so as to reduce the input speed of the automatic transmission 18, if the input speed is expected to be higher than a predetermined threshold, when the shift lever 42 is operated from the neutral or parking position to the drive position The start-up control routine of FIG. 12 is initiated with step SC1 to determine whether the shift lever 42 has been operated from the neutral position "N" to the drive position "D". If a negative decision (NO) is obtained in step SC1, the control flow goes to step SC2 to determine whether the shift lever 42 has been operated from the neutral position "N" to the reverse position "R". If a negative decision (NO) is obtained in step SC2, the control flow goes to step SC3 to determine whether the shift lever 42 has been operated from the parking position "P" to the reverse position "R". The currently established position of the shift lever 42 is detected on the basis of the output signal of the shift position sensor 66 (FIG. 2). If an affirmative decision (YES) is obtained in any one of the steps SC1, SC2 and SC3, the control flow goes to step SC4 to determine whether the operation mode 1 (MOTOR DRIVE mode) to start and drive the vehicle by operation of the motor/generator 14 has been selected. This determination is effected on the basis of a result of execution of the operation mode determining sub-routine of FIG. 8. If an affirmative decision (YES) is obtained in step SC4, the control flow goes to step SC9 and the following steps. If a negative decision (NO) is obtained in step SC4, the control flow goes to step SC5 to determine whether the operation mode 5 (VEHICLE START BY ENGINE mode) to start the vehicle by operation of the engine 12 has been selected. This determination is also effected on the basis of the result of execution of the sub-routine of FIG. 8. If an affirmative decision (YES) is obtained in step SC5, the control flow goes to steps SC6 and the following steps.

Step SC9 is provided to determine whether an abrupt start of the vehicle by the motor/generator 14 is required. This determination is effected by determining whether the speed $N_M$ of the motor/generator 14 is higher than a predetermined threshold $N_{M1}$ while the vehicle running speed V is substantially zero. If a negative decision (NO) is obtained in step SC9, the control flow goes to step SC11 in which the motor/generator 14 is controlled in the normal manner. If an affirmative decision (YES) is obtained in step SC9, the control flow goes to step SC10 in which the motor/generator 14 is operated with its torque $T_M$ being reduced. In the MOTOR DRIVE mode (operation mode 1), the rotary elements of the planetary gear device 16 are rotated as a unit with the second clutch CE2 being placed in the engaged state, and therefore the speed $N_M$ of the motor/generator 14 is the same as the input speed $N_I$ of the automatic transmission 18. Further, the motor torque $T_M$ operated in the MOTOR DRIVE mode is controlled according to the operating amount $\theta_{AC}$ of the accelerator pedal, irrespective of whether the shift lever 42 is placed in the non-drive state (neutral or parking position "N" or "P") or drive state (drive or reverse position "D" or "R"). The predetermined threshold $N_{M1}$ indicated above is an upper limit above which the durability of the clutches C1 C2 at least one of which is engaged upon operation of the shift lever 42 to the drive state is expected to be deteriorated by an excessive load acting on the clutches C1 C2 due to an inertia of the motor/generator. Different values may be used as the threshold $N_{M1}$ depending upon whether the shift lever 42 is operated to the drive or reverse position "D", "R".

In the normal control of the motor/generator 14 in step SC11, the motor torque $T_M$ is controlled on the basis of the operating amount $\theta_{AC}$ of the accelerator pedal and according to a predetermined relationship between the operating amount $\theta_{AC}$ and the motor torque $T_M$, which relationship is represented by a data map or equation stored in the ROM of the hybrid drive controller 50. Since the input speed $N_I$ of the automatic transmission 18 which is equal to the motor speed $N_M$ is lower than the threshold $N_{M1}$ in the normal control, the clutches C1 C2 are protected from deterioration of their durability due to excessive load in the normal control. The motor torque $T_M$ is controlled so as to provide a desired torque ("creep torque") to slowly start the vehicle with the shift lever 42 placed in the drive state, even when the accelerator pedal is not depressed, namely, even when the operating amount $\theta_{AC}$ is substantially zero. In the torque reduction control in step SC10, the motor torque $T_M$ is reduced to reduce the motor speed $N_M$, so that the clutches C1 C2 are protected from deterioration of their durability due an excessive load, and the automatic transmission 14 is protected from a shifting shock due to a variation in the drive force.

Step SC6 is provided to determine whether an abrupt start of the vehicle by the engine 12 is required. This determination is effected by determining whether the engine speed $N_E$ is higher than a predetermined threshold $N_{E1}$ while the vehicle speed V is substantially zero. If an affirmative decision (YES) is obtained step SC6, the control flow goes to step SC7 in which the characteristic of rise of the torque (reaction torque) $T_M$ of the motor/generator 14 is suitably controlled. Where the vehicle is started by the engine 12 in the ENGINE START BY ENGINE mode (operation mode 5), the reaction torque $T_M$ of the motor/generator 14 is controlled to be increased from zero, namely, to rise, to transmit the power from the engine 12 to the input shaft 26, for slowing starting the vehicle. If the engine speed $N_E$ is excessively high, the durability of the automatic transmission 18 and the propeller shaft may be deteriorated due to an excessive load caused by an inertia of the engine 12. The threshold $N_{E1}$ is determined to prevent such an excessive load on the automatic transmission 18 and the propeller shaft. Usually, the inertia of the engine 12 is larger than that of the motor/generator 14, and therefore the threshold $N_{E1}$ is smaller than the threshold $N_{M1}$. For instance, the threshold $N_{E1}$ is determined to be about 3000 r.p.m. Different values may be used as the threshold $N_{E1}$ depending upon whether the shift lever 42 is operated to the drive or reverse position "D", "R".

In the normal control in step SC8, the opening angle of the throttle valve and the amount of fuel injection into the engine 12 are controlled on the basis of the operating amount $\theta_{AC}$ of the accelerator pedal and predetermined relationships between the operating amount $\theta_{AC}$ and the throttle opening angle and fuel injection amount, which relationships are represented by stored data maps or equations. Further, the reaction torque $T_M$ of the motor/generator 14 is controlled to rise according to a predetermined standard rise characteristic or pattern, for transmitting the power from the engine 12 to the automatic transmission 18. Since the engine speed $N_E$ is lower than the threshold $N_{E1}$, the automatic transmission 18 and the propeller shaft are protected from deterioration of the durability due to an excessive load. The motor torque $T_M$ is raised according to the standard rise characteristic even when the accelerator pedal is not depressed, namely, even when the operating amount $\theta_{AC}$ is substantially zero. That is, the vehicle is slowly started with a torque ("creep torque") corresponding to the idling speed of the engine 12. Broken lines in the time chart of FIG. 13 indicate changes in the engine speed $N_E$ and motor torque (regenerative braking torque) $T_M$ in the normal control in step SC8 when the shift lever 42 is operated from the neutral position "N" to the drive position "D" with the accelerator pedal placed in the non-operated position. The time chart also indicates a change in engaging hydraulic pressure $P_{C1}$ of the clutch C1. After the clutch C1 has been fully engaged, the torque $T_M$ of the motor/generator 14 is controlled.

Figure 13:
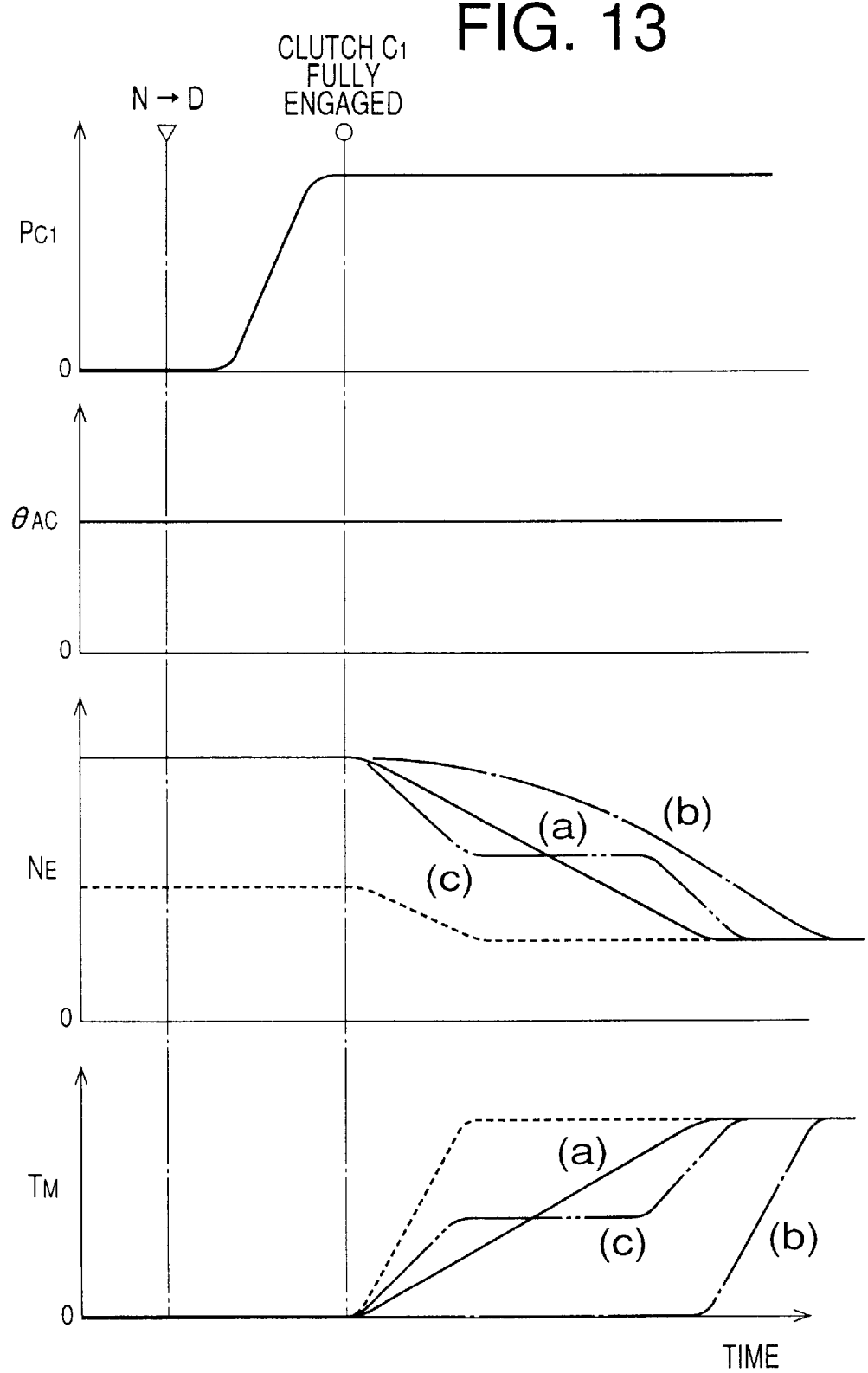
FIG. 13 is a time chart indicating changes of various parameters when the start-up control routine of FIG. 12 is executed upon operation of shift lever from non-drive position to drive position.

In step SC7, the rise characteristic of the reaction torque $T_M$ of the motor/generator 14 is controlled so as to slowly increase the power to be transmitted to the automatic transmission 18, for thereby preventing the deterioration of the durability of the automatic transmission 18 due to an excessive load. That is, the rate of rise of the reaction torque in step SC7 is lower than that in the normal control of step SC8. The time chart of FIG. 13 shows three different desired rise characteristics of the motor reaction torque $T_M$. In the example (a) indicated by solid line, the reaction torque $T_M$ is controlled to rise at a lower rate than in the normal control indicated by the broken line. In the example (b) indicated by one-dot chain line, the rise of the reaction torque $T_M$ is inhibited until the engine speed $N_E$ has been lowered below a predetermined value. In the example (c) indicated by two-dot chain line, the initial amount of rise of the reaction torque $T_M$ is made comparatively short. In any one of these examples (a), (b) and (c), an abrupt change of the engine speed $N_E$ is prevented, and an inertia of the engine 12 due to such an abrupt change of the speed $N_E$ is reduced, so that the load acting on the automatic transmission 18 and the propeller shaft is reduced, and the shifting shock of the automatic transmission 18 due to a change in the drive force is minimized. Three examples of change in the engine speed $N_E$ also indicated at (a), (b) and (c) in FIG. 10 correspond to the three rise characteristics (a), (b) and (c) of the reaction torque $T_M$ of the motor/generator 14. In the example (b), the output of the engine 12 is reduced by the fuel cut of the engine 12, irrespective of the operating amount $\theta_{AC}$ of the engine 12.

In the present embodiment, the characteristic of rise of the reaction torque $T_M$ is controlled in step SC7, so as to permit a slow or smooth increase in the drive force to be transmitted to the automatic transmission 18, for slowly start the vehicle by the engine 12, if an abrupt or sudden start of the vehicle by the engine 12 is required in the operation mode 5 (VEHICLE START BY ENGINE mode), that is, if the engine speed $N_E$ in the operation mode 5 is higher than the threshold $N_{E1}$ while the vehicle speed V is substantially zero, when the shift lever 42 is operated to the drive position "D" or "RR". This arrangement is effective to prevent a shifting shock of the automatic transmission 18 and an excessive load of the drive line (including the automatic transmission 18, propeller shaft, etc.) upon operation of the shift lever 42 to the drive state in the operation mode 5.

When an abrupt start of the vehicle by the motor/generator 14 is required upon operation of the shift lever 42 to the drive state in the operation mode 1 (MOTOR DRIVE mode), with the motor speed $N_M$ being higher than the threshold $N_{M1}$ while the vehicle speed V is substantially zero, the torque $T_M$ of the motor/generator 14 is reduced to accordingly lower the input speed $N_I$ of the automatic transmission 18, whereby the inertia of the motor/generator 14 is reduced to minimize the shifting shock and load of the automatic transmission 18.

In the present embodiment, the conditions to be satisfied to determine the abrupt start of the vehicle in steps SC6 and SC9 consist of the engine or motor speed $N_E$, $N_M$ higher than the threshold $N_{E1}$, $N_{M1}$ and the vehicle speed V substantially zero. However, the conditions to be satisfied to obtain the affirmative decision (YES) in steps SC6, SC9 may be suitably changed. For instance, a condition that the accelerator pedal is in the operated position, with its operating amount $\theta_{AC}$ larger than a predetermined threshold.

Referring next to the flow chart of FIG. 14, there will be described an alternative start-up control routine which is used in the second embodiment of this invention, in place of the start-up control routine of FIG. 12 used in the first embodiment. In this second embodiment, a portion of the hybrid drive controller 50 assigned to implement steps SD2–SD5, SA7, SD11 and SD13 cooperates with the portion of the controller 50 assigned to implement step S9 of FIG. 8 to constitute the start-up control means.

Figure 14:
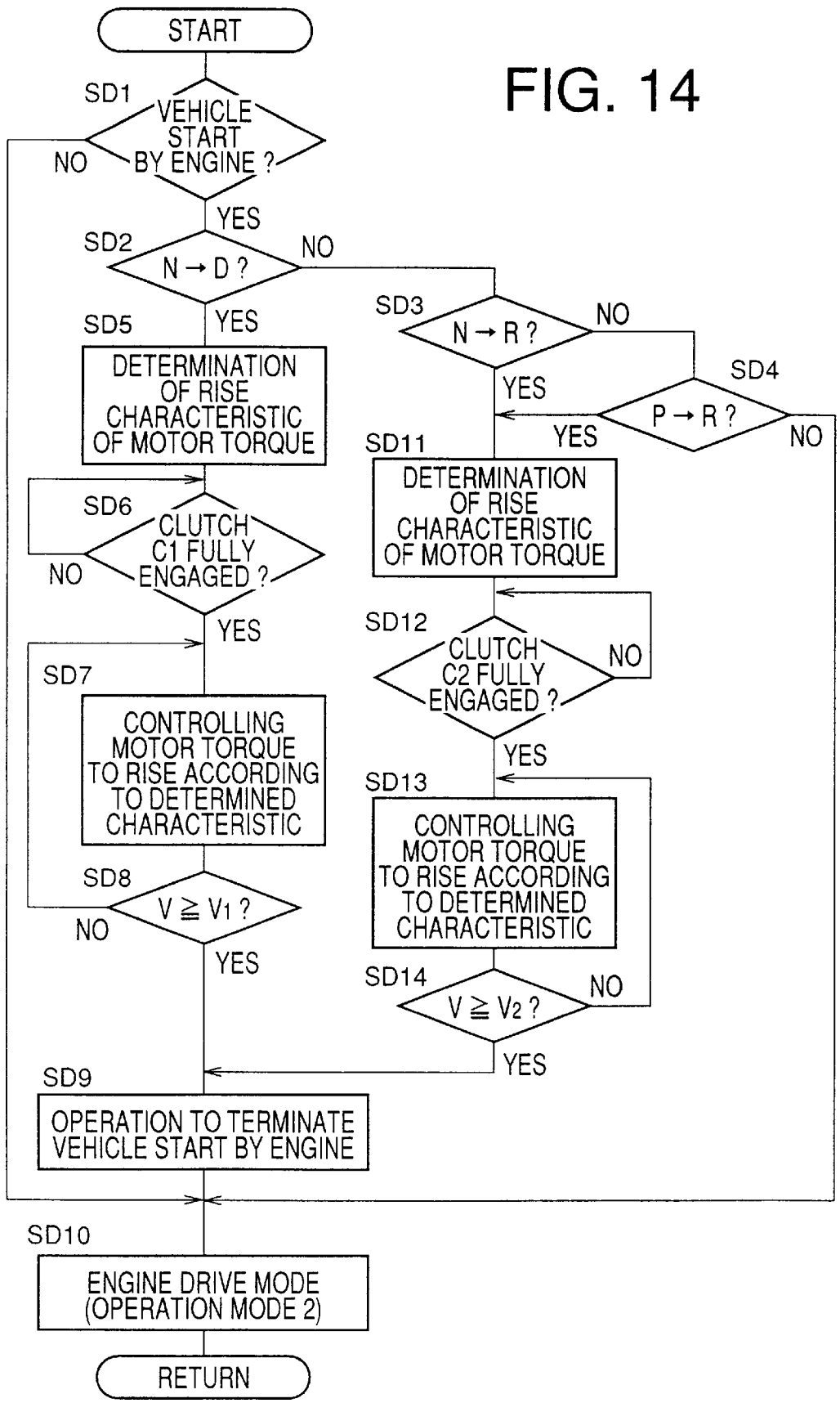
FIG. 14 is a flow chart illustrating a start-up control routine used in a second embodiment of this invention.

The routine of FIG. 14 is initiated with step SD1 to determine whether the operation mode 5 (VEHICLE START BY ENGINE mode) is established. If an affirmative decision (YES) is obtained in step SD1, the control flow goes to SD2 to determine whether the shift lever 42 has been operated from the neutral position "N" to the drive position "D". Steps SD1 and SD2 cooperate to determine whether the operation mode has been changed from the operation mode 7 to the operation mode 5. If an affirmative decision (YES) is obtained in step SD2, the control flow goes to step SD5 and the following steps for controlling the rise characteristic of the motor torque for starting the vehicle in the forward direction. If a negative decision (NO) is obtained in step SD2, the control flow goes to steps SD3 and SD4 to determine whether the shift lever 42 has been operated from the neutral position "N" to the reverse position "RR", and whether the shift lever 42 has been operated from the parking position "PP" to the reverse position "R". If an affirmative decision (YES) is obtained in step SD3 or SD4, the control flow goes to step SD11 and the following steps for controlling the rise characteristic of the motor torque for starting the vehicle in the rearward direction.

In steps SD5, SD11, the rise characteristic of the reaction torque (regenerative braking torque in this embodiment) of the motor/generator 14 is determined depending upon the running condition of the vehicle. Steps SD5, SD11 are followed by steps SD6, SD12, respectively, to determine whether the clutches C1 C2 have been fully engaged, respectively, namely, whether the automatic transmission 18 has been shifted to the forward drive and rear drive states, respectively. The determinations in steps SD6, SD12 may be effected on the basis of a time lapse measured by a timer after the affirmative decision (YES) is obtained in step SD2, SD3, SD4, on the basis of the hydraulic pressures of the clutches C1 C2, or on the basis of the rotating speeds of the input and output rotary members which are connected by the clutches C1 C2. When the shift lever 42 is operated to the reverse position "R", the brake B4 is also engaged. Since the hydraulic control device 44 is adapted such that the full engagement of the brake B4 is completed before the full engagement of the clutch C2, the completion of the full engagement of only the clutch C2 is determined in step SD12.

After the clutch C1 or C2 has been fully engaged, step SD7 or SD13 is implemented to control the motor torque (regenerative braking torque) $T_M$ of the motor/generator 14 so as to rise according to the rise characteristic determined in step SD5, SD11. The motor torque $T_M$ is controlled to rise, in a well known feed-forward control fashion, for example, so that the power is transmitted from the engine 12 to the automatic transmission 18 to slowly start the vehicle. Then, the control flow goes to step SD8, SD14 to determine whether the vehicle speed V has been raised to a predetermined threshold V1, V2. If an affirmative decision (YES) is obtained in step SD8, SD14, the control flow goes to step SD9 in which the operation in the operation mode 5 is terminated. Step SD9 is followed by step SD10 in which the operation mode 2 is established to drive the vehicle by the engine 12 in the normal manner as described above with respect to FIG. 9 of the sub-routine of FIG. 8. Thus, the operation mode is changed from the operation mode 5 to the operation mode 2. In this connection, it is desirable to control the motor torque $T_M$ so as to operate the motor/generator 14 in the same direction as the engine 12, and increase the reaction torque .until the engine speed $N_E$ and the motor speed $N_M$ become substantially equal to each other, so that the operation mode is switched from the operation mode 5 to the operation mode 2.

Figure 15:
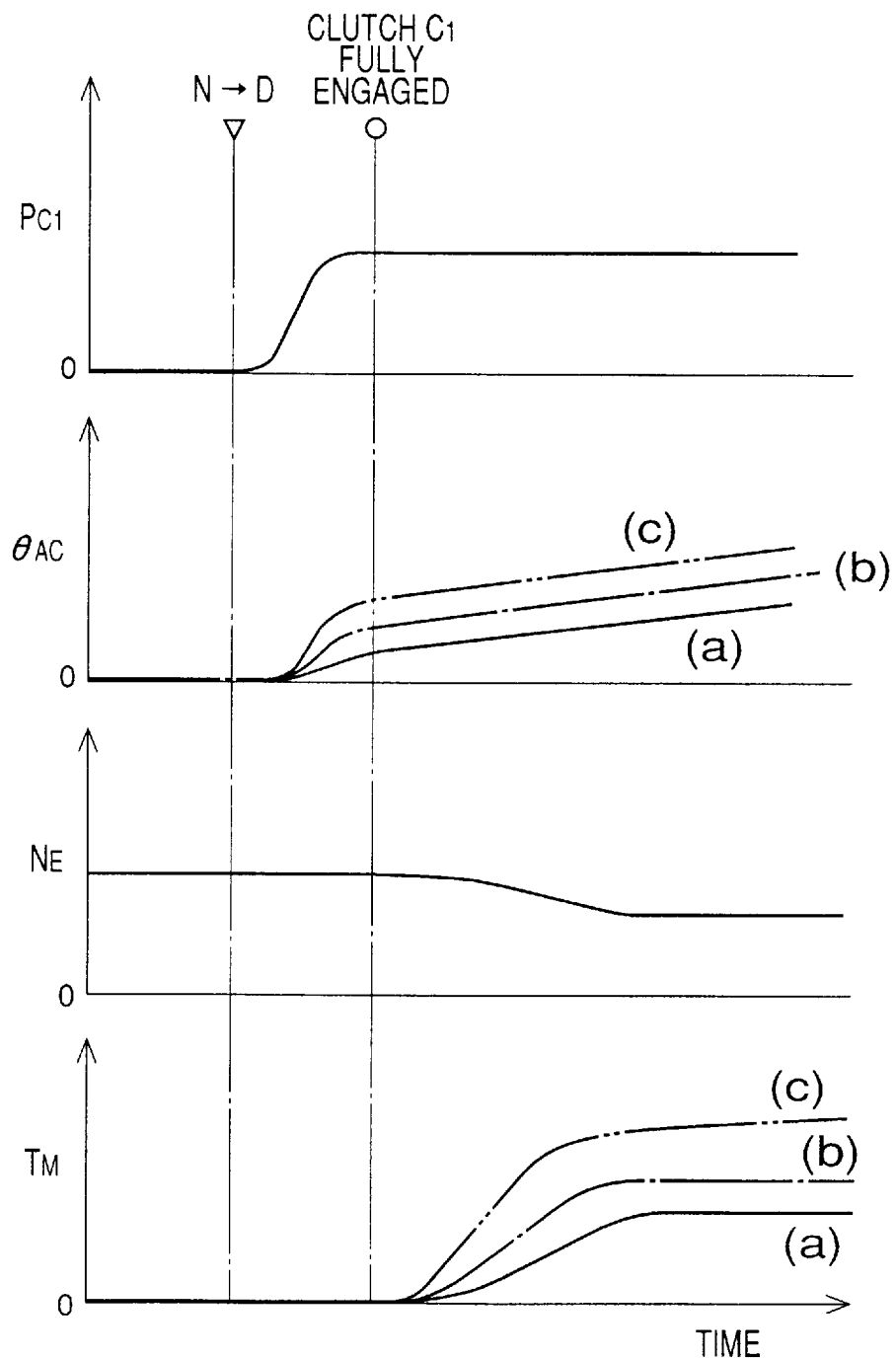
FIG. 15 is time chart indicating changes of various parameters when the start-up control routine of FIG. 14 is executed.

The hybrid drive system 10 is not equipped with a fluid-operated torque converter, and the engine torque $T_E$ is transmitted directly to the automatic transmission 18 according to the torque $T_M$ (regenerative braking torque) of the motor/generator 14. To increase the drive force for starting the vehicle as desired by the vehicle operator while avoiding a shifting shock and an overload of the automatic transmission 18, therefore, the motor torque $T_M$ is controlled to rise according to a selected one of different characteristics depending upon the specific running condition of the vehicle. FIG. 15 shows three different characteristics of rise of the motor torque $T_M$ when the accelerator pedal is depressed immediately after the shift lever 42 is operated from the neutral position "N" to the drive position "D". In the example (a) indicated by solid line, the motor torque $T_M$ is raised to a relatively small value at a relatively low rate, with the operating amount $\theta_{AC}$ of the accelerator pedal being relatively small. In the example (b) indicated by one-dot chain line, the motor torque $T_M$ is raised to a medium value at a medium rate, with the operating amount $\theta_{AC}$ of the accelerator pedal being medium. In the example (c) indicated by solid line, the motor torque $T_M$ is raised to a relatively large value at a relatively high rate, with the operating amount $\theta_{AC}$ of the accelerator pedal being relatively large.

Figure 16:
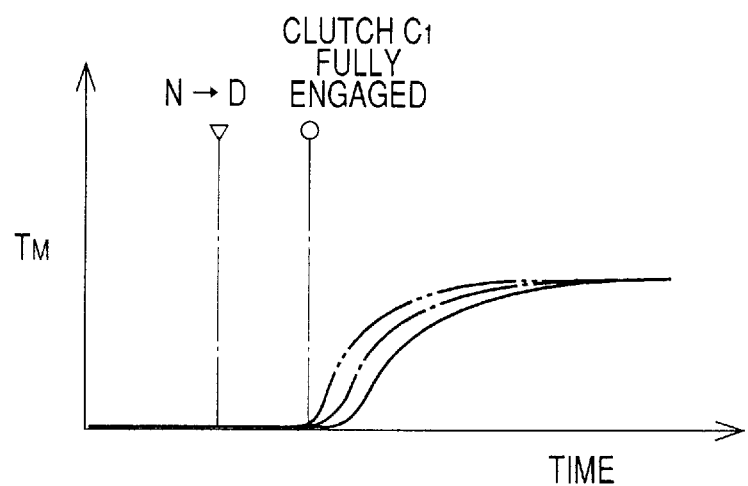
FIG. 16 is a view for explaining examples of a motor torque rise characteristic determined in steps SD5 and SD11 of the routine of FIG. 14.

FIG. 16 shows cases where the characteristic of rise (rate of rise) of the motor torque $T_M$ is determined depending upon the rate of increase in the accelerator pedal operating amount $\theta_{AC}$. In this case, the motor torque $T_M$ is controlled to rise at different rates corresponding to the different rates of increase of the operating amount $\theta_{AC}$, even if the operating amount $\theta_{AC}$ is the same. Solid line in FIG. 16 shows a case where the motor torque $T_M$ is controlled to rise at a relatively low rate with the operating amount $\theta_{AC}$ being increased at a relatively low rate. One-dot chain line in FIG. 16 shows a case where the motor torque $T_M$ is controlled to rise at a medium rate with the operating amount $\theta_{AC}$ being increased at a medium rate. Two-dot chain line in FIG. 16 shows a case where the motor torque $T_M$ is controlled to rise at a relatively high rate with the operating amount $\theta_{AC}$ being increased at a relatively high rate.

Figure 17:
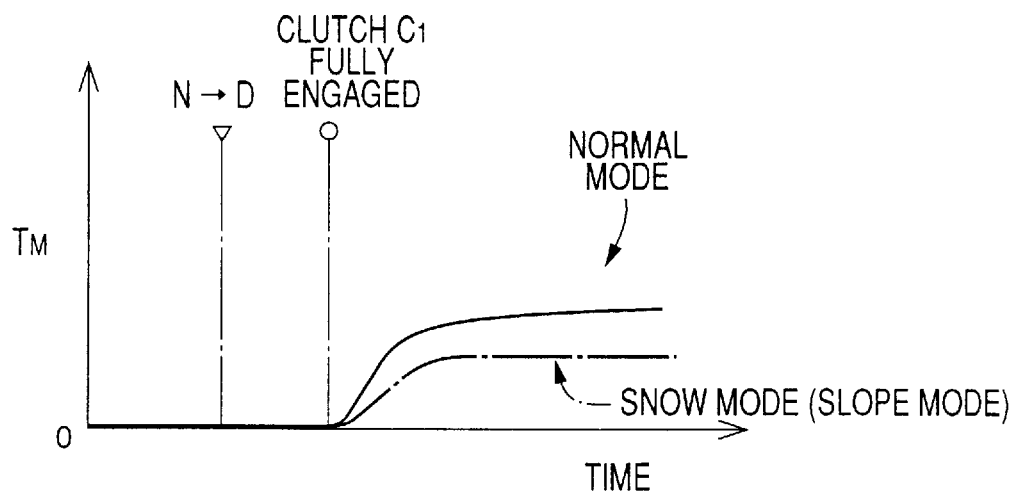
FIG. 17 is a view for explaining further examples of the motor torque rise characteristic determined in steps SD5 and SD11.

FIG. 17 shows cases where the drive mode of the vehicle is selected by the MODE SELECT switch 68 (FIG. 2), which has a plurality of positions corresponding to different vehicle drive modes such as a SNOW mode and a SLOPE mode as well as a NORMAL mode. One-dot chain in FIG. 16 shows a case where the motor torque $T_M$ is controlled to rise to a smaller value at a lower rate, than in the normal case indicated by solid line. The SNOW mode is selected when the road surface on which the vehicle is run. has a relatively low friction coefficient $\mu$, for example, when the road surface is covered with snow. In the SNOW mode, the vehicle drive force and the automatic transmission 18 are controlled so as to start the vehicle with a relatively small starting torque ("creep torque"). The SLOPE mode is selected to prevent the stationary vehicle from moving backward on a downhill road. It will be understood that the MODE SELECT switch 68 functions as vehicle drive mode selecting means for selecting one of vehicle running modes (vehicle running conditions). These vehicle running modes should be distinguished from the operation modes 1–9 of the hybrid drive system 10 indicated in FIG. 9. The vehicle drive mode selecting means may have positions for selecting a POWER mode or a SPORTY DRIVE mode for running the vehicle with relatively high drivability, and an ECONOMY mode for running the vehicle with relatively high fuel economy. In the POWER or SPORTY mode, the motor torque $T_M$ is controlled to rise at a higher rate than in the NORMAL or ECONOMY mode.

Figure 18:
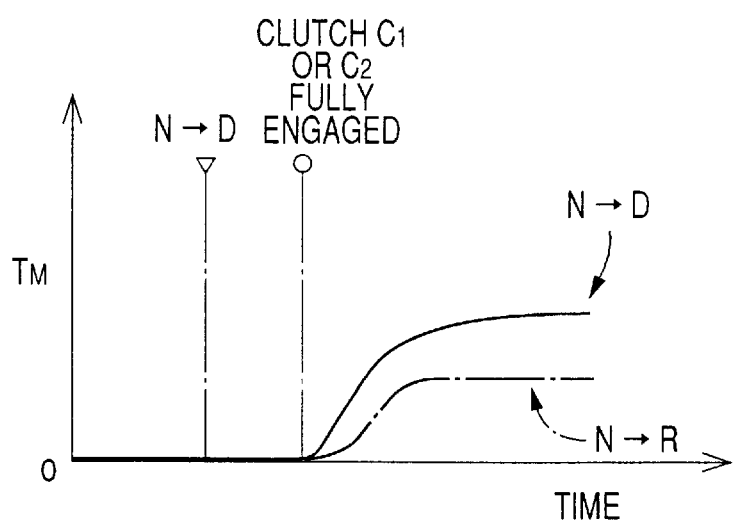
FIG. 18 is a view for explaining still further examples of the motor torque rise characteristic.

FIG. 18 shows cases where the shift lever 42 is operated from the neutral position "N" to the drive position "D" or reverse position "R". In the case indicated by one-dot chain line where the shift lever 42 is operated to the reverse position "R", the amount of rise of the motor torque $T_M$ is smaller than in the case indicated by solid line where the shift lever 42 is operated to the drive position "D". Although the speed ratio of the rear-drive position "Rev" of the automatic transmission 18 established in the reverse position "R" of the shift lever 42 is higher than that of the 1st-speed position "1st" (forward drive state) established in the drive position "D", as indicated in FIG. 3, the torque ("creep torque") for starting the vehicle with the automatic transmission 18 placed in the rear-drive position "Rev" can be made substantially the same as that with the automatic transmission 18 placed in the 1st-speed position "1st", when the accelerator pedal is placed in the non-operated position (engine idling position).

Where the operation of the shift lever 42 from the neutral position "N" to the drive position "D" takes place during running of the vehicle (V>V1), the rate of change in the speed $N_E$ of the engine 12 is lower and the inertia of the engine 12 is smaller than when the operation takes place while the vehicle is stopped (V=0). Accordingly, the motor torque $T_M$ can be controlled to rise at a higher rate where the shift lever is operated to the drive position "D" when the vehicle is running, than when the vehicle is stopped. This applies to other operations of the shift lever 42 from the non-drive state to the drive state.

As described above, the second embodiment is adapted such that the torque $T_M$ (regenerative braking torque) of the motor/generator 14 is controlled to rise according to a predetermined rise characteristic determined by the specific running condition, so as to start the vehicle with a drive force desired by the vehicle operator, while preventing a shifting shock and an excessive load (overload) of the automatic transmission 18, where the vehicle is started by operation of the engine 12 in the operation mode 5, upon operation of the shift lever 42 from the neutral position "N" to the drive position "D" or reverse position "R" or from the parking position "P" to the reverse position "R".

In the cases of FIG. 14 where the vehicle drive mode is selected by the MODE SELECT switch 65, the amount of rise of the reaction torque $T_M$ in the SNOW mode is made smaller than in the NORMAL drive mode, as indicated in FIG. 17, whereby the vehicle can be smoothly started with a reduced amount of slip of the drive wheels on a road surface having a low friction coefficient $\mu$. In the cases of FIG. 15, the amount of rise of the reaction torque is changed depending upon whether the shift lever 42 is operated to the drive position "D" Or reverse position "R", so that the values of the vehicle starting torque ("creep torque" in the drive and reverse positions "D" and "R" with the accelerator pedal placed in the non-operated position are made substantially equal to each other irrespective of the difference in the speed ratio between the forward and rearward drive positions "1st" and "Rev" of the automatic transmission 18. Therefore, the shifting shock in the reverse position "R" can be reduced as in the forward drive position "D".

Referring to the flow chart of FIG. 19, there is illustrated a routine which is executed by the hybrid drive controller 50 in a third embodiment of this invention, for feedback controlling a rise of the motor torque or regenerative braking torque $T_M$ of the motor/generator 15 upon starting of the vehicle in the operation mode 5 (VEHICLE START BY ENGINE mode), and for effecting learning compensation of the motor torque $T_M$. It will be understood that a portion of the hybrid controller 50 assigned to implement steps SE1–SE9 of FIG. 19 cooperates with the portion of the controller 50 assigned to implement step S9 of FIG. 8 to provide the start-up control means.

The routine of FIG. 19 is initiated with step SE1 to determine whether the shift lever 42 is operated from the non-drive position ("N" or "P") to the drive position "D" or "R"). If an affirmative decision (YES) is obtained in step SE1, the control flow goes to step SE2 to determine whether the operation mode 5, that is, VEHICLE START BY ENGINE mode has been established. If an affirmative decision (YES) is obtained in step SE2, the control flow goes to step SE3 to determine a basic torque rise characteristic $T_{TRG}$ of the input shaft 226, and obtain a target torque rise characteristic $T_{TRG}^*$ by adding a learning compensation value $\Delta T_{TRG}$ to the determined basic torque rise characteristic $T_{TRG}$. The basis torque rise characteristic $T_{TRG}$ is primarily determined depending upon the currently established vehicle drive mode (SPORTY mode, SNOW mode, etc.), the operation of the shift lever 42 from the specific non-drive state to the specific drive state, and the currently established position of the automatic transmission 18. However, the basic torque rise characteristic $T_{TRG}$ is determined also by other vehicle running conditions such as coil temperature $T_{TEMP}$ of the motor/generator 14, oil temperature $T_{ATF}$ of the automatic transmission 18 and operating amount $\theta_{AC}$ of the accelerator pedal. Basic control data maps for determining the basic torque rise characteristic $T_{TRG}$ are stored in the ROM of the controller 50. The learning compensation value $\Delta T_{TRG}$ is determined by the oil temperature $T_{ATF}$, coil temperature $T_{TEMP}$ and accelerator pedal operating amount $\theta_{AC}$, according to predetermined learning compensation data maps also stored in the ROM. Example of such learning compensation data maps are shown in FIGS. 20A and 20B.

Step SE3 is followed by step SE4 in which a target rise characteristic $T_M^*$ of the motor torque or regenerative braking torque $T_M$ of the motor/generator 14 is determined depending upon the currently required output of the engine 12 as represented by the operating amount $\theta_{AC}$ so as to obtain the target torque rise characteristic $T_{TRG}^*$ of the linput shaft 26 of the automatic transmission 18. In step SE4, the torque $T_M$ is controlled in the feed-forward fashion, so as to rise according to the target rise characteristic $T_M^*$. Step SE4 is followed by step SE5 to obtain a difference or error $\Delta T$ between the basic torque rise characteristic $T_{TRG}$ and an actual torque value $T_I$ of the input shaft 26. Step SE5 is followed by step SE6 to determine whether an absolute value $|\Delta T|$ of the difference $\Delta T$ is equal to or larger than a predetermined amount $\alpha$. If an affirmative decision (YES) is obtained in step SE6, the control flow goes to step SE7 to compensate the motor torque $T_M$ on the basis of the difference $\Delta T$. and according to the following equation (1):

$$T_M = T_M + k \cdot \Delta T \tag{1}$$

That is, the motor torque $T_M$ which is feed-forward controlled to rise according to the target rise characteristic $T_M^*$ is feedback controlled so that the actual torque $T_I$ of the input shaft 26 of the automatic transmission 18 changes according to the basic torque rise characteristic $T_{TRG}$. It is noted that the input torque $T_I$ of the automatic transmission 18 is a physical value which changes in relation to the control of the reaction torque of the motor/generator 14. The input torque $T_I$ may be detected by a torque sensor provided on the input shaft 26. The predetermined amount a may be zero, and may be determined depending upon the specific operation of the shift lever 42 from the non-drive state to the drive state. In the above equation (1), "k" represents a gain in the feedback control.

Step SE7 is followed by step SE8 to determine whether the start-up control of the motor torque $T_M$ is terminated. This determination is effected on the basis of a time lapse measured by a timer after the operation mode 5 is established, or on the basis of the input torque $T_I$ or the input speed $N_I$ of the input shaft 26. If an affirmative decision (YES) is obtained in step SE8, the control flow goes to step SE9 to calculate the new learning compensation value $\Delta T_{TRG}$, and update the learning compensation data maps. The learning compensation value $\Delta T_{TRG}$ is determined on the basis of the feedback compensation value $k \cdot \Delta T$ in the above equation (1). Described in detail, the learning compensation value $\Delta T_{TRG}$ is determined to change the target torque rise characteristic $T_{TRG}^*$ of the input shaft 26 and the target rise characteristic $T_M^*$ of the motor/generator 14, so as to zero or eliminate the feedback control error $\Delta T = T_{TRG} - T_I$.

Since the motor torque $T_M$ is controlled to rise so that the input torque $T_I$ of the automatic transmission 18 changes according to the basic torque rise characteristic $T_{TRG}$ which is determined depending upon the oil temperature $T_{ATF}$, coil temperature $T_{TEMP}$ and accelerator pedal operating amount $\theta_{AC}$, the automatic transmission 18 is protected against a shifting shock and an overload due to a variation or change in the oil or coil temperature $T_{ATF}$, $T_{TEMP}$ and in the operating amount $\theta_{AC}$. Further, the motor torque $T_M$ is feedback controlled so that the input torque $T_I$ changes according to the basic torque rise characteristic $T_{TRG}$, and the target rise characteristic $T_M^*$ of the motor torque $T_M$ is compensated by learning on the basis of the feedback compensation value $k \cdot \Delta T$, whereby the rise of the motor torque $T_M$ can be controlled with higher accuracy, irrespective of variations of the engine 12 and motor/generator 14 of individual motor vehicles, and irrespective of chronological changes of the output torque characteristics of the engine 12 and motor/generator 14 of the same motor vehicle.

While the third embodiment of FIGS. 19 and 20 is adapted to feedback control the motor torque $T_M$ on the basis of the input torque $T_I$ of the automatic transmission 18, the motor torque $T_M$ may be feedback controlled on the basis of any other physical parameter such as the motor speed $N_M$, engine speed $N_E$ or input shaft speed $N_I$, which changes upon starting of the vehicle.

Referring to the flow chart of FIGS. 21 and 22, there will be described a routine executed by the controller 50 in a fourth embodiment of the present invention, for controlling the "creep torque" for slowly starting the vehicle upon operation of the shift lever 42 to the drive position "D" or reverse position "R", with the accelerator pedal placed in the non-operated position. It will be understood that a portion of the controller 50 assigned to implement step SG4 and the following steps of FIGS. 21 and 22 cooperates with the portion of the controller 50 assigned to implement step S9 of FIG. 8 to constitute the start-up control means.

Figure 21:
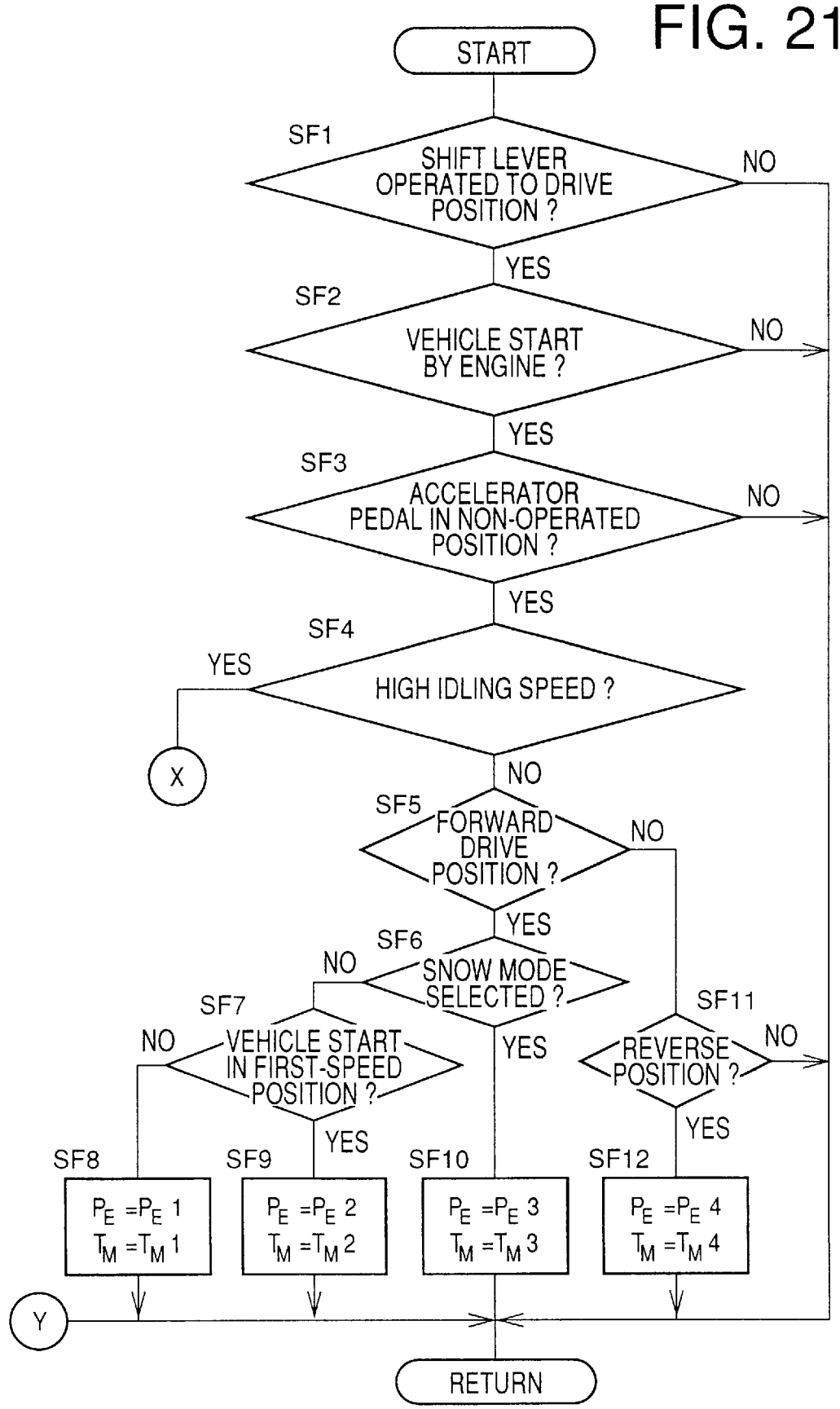
FIGS. 21 and 22 are flow charts illustrating a start-up control routine used in a third embodiment of this invention.
Figure 22:
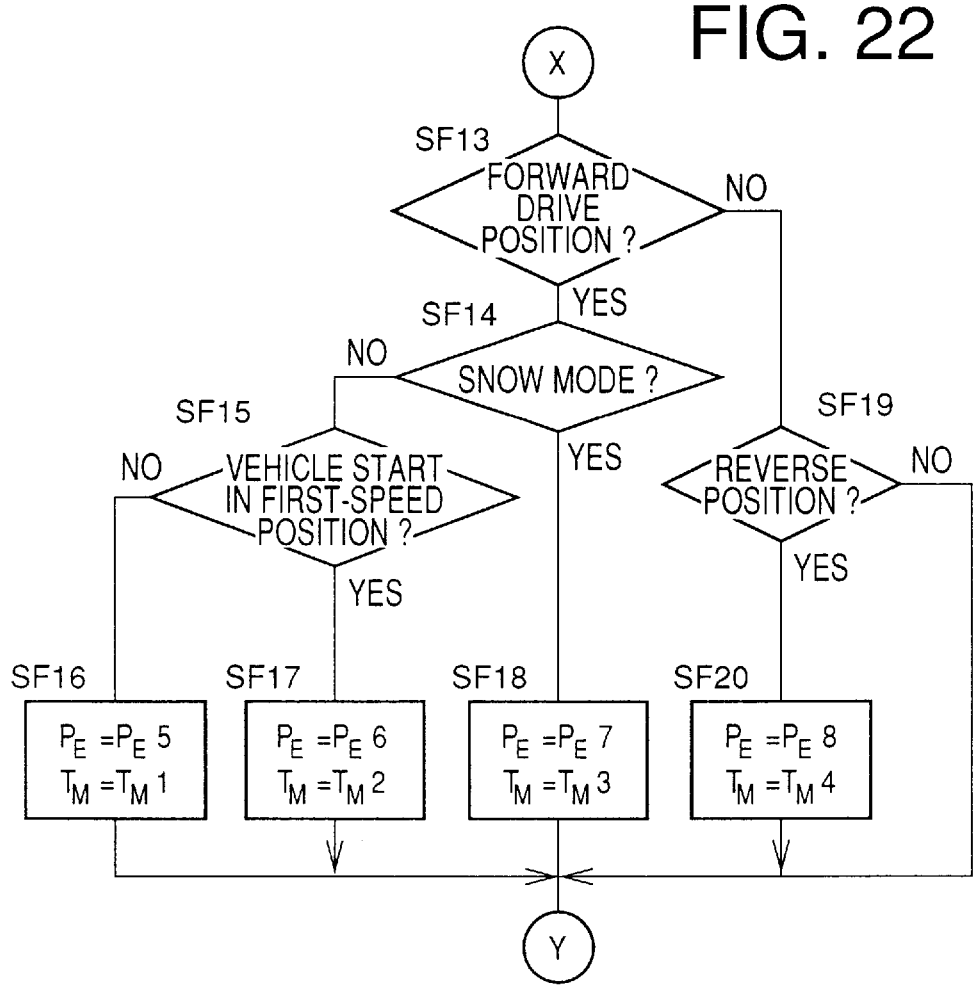

The start-up control routine of FIGS. 21 and 22 is initiated with steps SF1 and SF3 to determine whether the shift lever 42 has been operated to the drive position "D", "R", and to determine whether the operation mode 5 has been established. If an affirmative decision (YES) is obtained in steps SF1 and SF2, the control flow goes to step SF3 to determine whether the accelerator pedal is in the non-operated or idling position, that is, whether the accelerator pedal operating amount $\theta_{AC}$ is substantially zero. This determination may be effected on the basis of the output signal of the idling position switch incorporated in the throttle sensor 63. If an affirmative decision (YES) is obtained in step SF3, the control flow goes to step SF4 to determine whether the engine 12 is not operating at a predetermined normal idling speed, but is operating at a predetermined high idling speed. The high idling speed is selected during a warm-up period of the engine 12, for example. If a negative decision (NO) is obtained in step SF4, the control flow goes to step SF5 and the following steps. If an affirmative decision (YES) is obtained in step SF4, the control flow goes to step SF13 and the following steps of FIG. 22. Step SF5 is provided to determine whether the shift lever 42 has been operated to any one of the forward drive positions "D", "L", "2", "3" and "4" (FIG. 4). This determination is effected on the basis of the output signal of the shift position sensor 66. If an affirmative decision (YES) is obtained in step SF5, the control flow goes to step SF6 to determine whether the SNOW drive mode is established. If a negative decision (NO) is obtained in step SF5, step SF7 is implemented to determine whether the vehicle is required to start with the automatic transmission 18 placed in the first-speed position "1st". If an affirmative decision (YES) is obtained in step SF7, the control flow goes to step SF9. If a negative decision (NO) is obtained in step SF7, the control flow goes to step SF8. If a negative decision (NO) is obtained in step SF5, the control flow goes to step SF11 to determine whether the shift lever 42 has been operated to the reverse drive position "R". If an affirmative decision (YES) is obtained in step SF11, step SF12 is implemented.

Steps SF8, SF9, SF10 and SF12 are provided to determine an output $P_E$ of the engine 12 and the torque (regenerative braking torque) $T_M$ of the motor/generator 14. Engine output values $P_{E1}$–$P_{E4}$ have a relationship as represented by the following formula (2), while motor torque values $T_{M1}$–$T_{M4}$ have a relationship as represented by the following formula (3):

$$P_{E3} < P_{E4} \leq P_{E2} < P_{E1} \tag{2}$$

$$T_{M3} < T_{M4} \leq T_{M3} < T_{M1} \tag{3}$$

Since the input torque $T_I$ of the automatic transmission 18 is determined by the motor torque or reaction torque $T_M$, the input torque values $T_{I1}$–$T_{I4}$ corresponding to the motor torque values $T_{M1}$–$T_{M4}$ have the relationship as represented by the above formula (3). That is, $T_{I3}$ (in the SNOW drive mode) $< T_{I4}$ (in the reverse position "R") $\leq T_{I2}$ (in the first-speed position "1st") $< T_{I1}$ (in the forward drive position other than "1st"). With the motor torque values $T_{M1}$–$T_{M4}$ being determined in step SF8–SF10 and SF12 so as to meet the formula (3), the drive torque or "creep torque" for starting the vehicle at the idling speed of the engine 12 is suitably controlled.

Steps SF13 through SF20 are substantially identical to steps SF5 through SF12, except for engine output values $P_{E5}$–$P_{E8}$ which are determined in steps SF16–SF20 and which are larger than the respective values $P_{E1}$–$P_{E4}$ by amounts corresponding to a difference of the high engine idling speed from the normal idling speed.

In the present fourth embodiment, too, the amount of rise of the motor torque $T_M$ is controlled or changed depending upon the specific running condition of the vehicle, namely, depending upon whether the vehicle is in the SNOW drive mode, whether the shift lever 42 is placed in the reverse range "R", whether the automatic transmission 18 is placed in the first-speed position "1st" or in any of the other forward drive positions "2nd", "3rd", "4th" and "5th". As a result, the vehicle can be smoothly started with a creep torque desired by the vehicle operator, without an shifting shock or an overload, while the accelerator pedal is held in the non-operated position.

As described above, the output values $P_E$ of the engine 12 at the high idling speed are increased in steps SF16–SF29 with respect to those at the normal idling speed, but the motor torque values $T_M$ at the high engine idling speed remain the same as those at the normal engine idling speed. This arrangement is effective to prevent an excessive "creep torque" at the high engine idling speed, which is unexpected by the vehicle operator.

In the case where the engine output $P_E$ is changed in response to an operation of an air conditioner or other auxiliary device, the operation of such an auxiliary device does not cause a change in the motor torque (regenerative braking torque) $T_M$ when the vehicle is stopped with the accelerator pedal placed in the non-operated position, namely, does not cause an undesirable change in the "creep torque" for slowly starting the vehicle with the accelerator pedal in the non-operated position.

Figure 23:
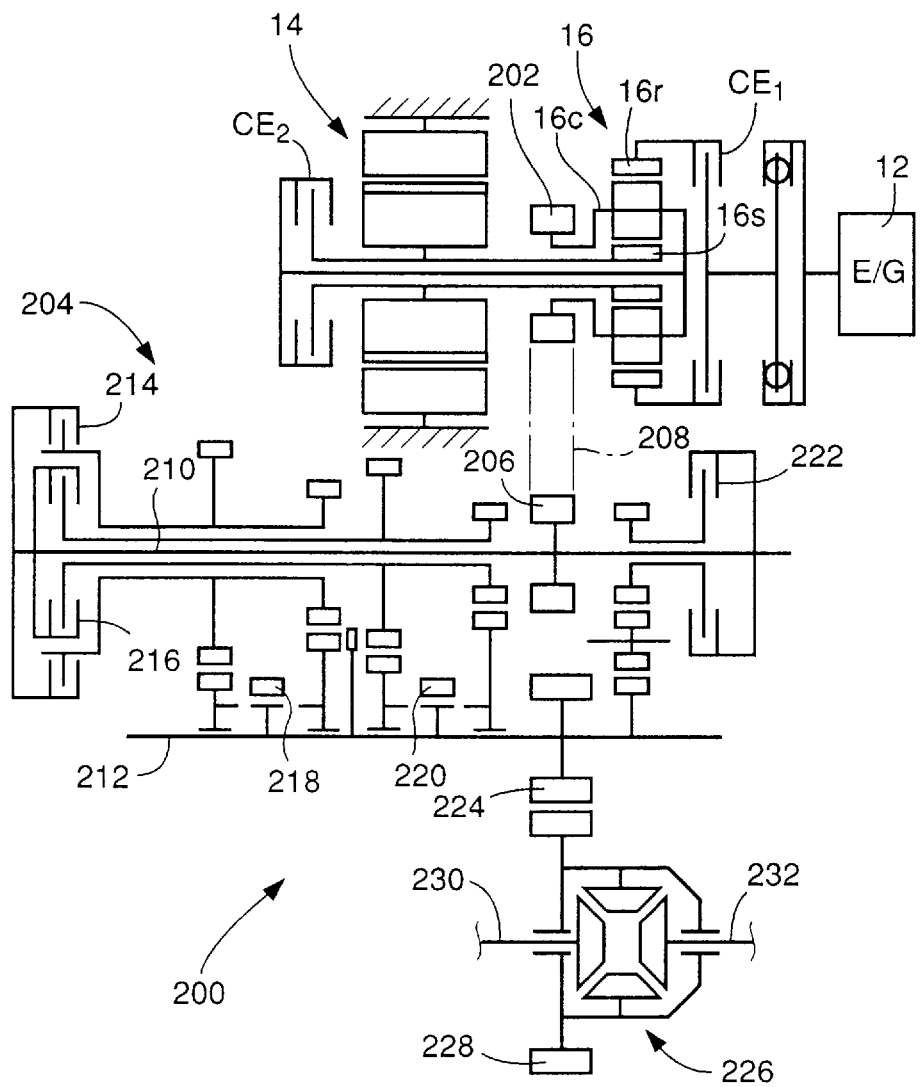
FIG. 23 is a schematic view showing a general arrangement of a hybrid drive system according to a fourth embodiment of the invention.

Referring next to FIG. 23, there will be described a hybrid drive system 200 for a front-engine front-drive motor vehicle, which is constructed according to a fourth embodiment of this invention. The present hybrid drive system 200 is installed on the motor vehicle such that various axes of the hybrid drive system 200 are substantially parallel to the transverse or lateral direction (width direction) of the motor vehicle. The hybrid drive system 200 includes the engine 12, motor/generator 14, planetary gear device 16, first clutch CE1 and second clutch CE2, which are disposed coaxially with each other, in the order different from that in the hybrid drive system 10 of FIG. 1. The carrier 16c of the planetary gear device 16 has an integrally formed driving sprocket 206, which functions as an output member. The driving sprocket 202 is connected through a chain 208 to a driven sprocket 206 which functions as an input member of an automatic transmission 204.

The automatic transmission 204 is a parallel two-axes type transmission having a first or input shaft 210 on which the driven sprocket 206 is provided, and a second or output shaft 212 parallel to the first shaft 210. The automatic transmission 204 has four pairs of mutually meshing gears for forward running of the vehicle, and a pair of gears connected through an idler gear for reverse running of the vehicle. The automatic transmission 204 includes two frictionally coupling clutches 214, 216 operated by respective hydraulic actuators, and two positive or claw clutches 218, 220 operated by respective hydraulic actuators. With these clutches 214, 216, 218, 220 selectively placed in their engaged and released positions, the automatic transmission 204 is selectively placed in one of a neutral position (non-drive state) and four forward-drive positions (forward-drive state). The automatic transmission 204 further includes a frictionally coupling clutch 222 operated by a hydraulic actuator for establishing a reverse-drive position (reverse drive state). the second or output shaft 212 has an output gear 224 mounted thereon,. which meshes with a ring gear 228 of a bevel gear type differential gear device 226. The ring gear 228 functions as an input member of the differential gear device 226. Power transferred to the output gear 224 is distributed to right and left drive wheels (front wheels) of the vehicle through a pair of output shafts 230, 232 of the differential gear device 226. In FIG. 23, a portion corresponding to the lower half of the second shaft 212 is not shown except for the output gear 224, since the assembly including the second shaft 212 is symmetrical with respect to the axis of the second shaft 212.

Like the hybrid drive system 10, the hybrid drive system 200 has a plurality of operation modes, which include at least the ENGINE DRIVE mode (operation mode 2), MOTOR DRIVE mode (operation mode 1) and ENGINE≦MOTOR DRIVE mode (operation mode 4), which are indicated in the table of FIG. 24 as "E/G", "M/G" and "E/G+M/G", respectively. The table of FIG. 24 shows the relationships between the operating positions of the automatic transmission 204 and the operating states of the various clutches in each of the three operation modes indicated above. In the table, "○" represents the engaged states of the clutches, and "Δ" indicates that the clutch CE2 may be either engaged or released to establish the operating positions of the automatic transmission 204 in the ENGINE≦MOTOR DRIVE mode (E/G+M/G).

The hybrid drive system 200 is controlled by a controller similar to the hybrid drive controller 50. The controller for the hybrid drive system 200 is adapted to execute a routine illustrated in the flow chart of FIG. 25. It will be understood that the vehicle drive motor control means includes a portion of the controller assigned to implement steps SG10, SG12, SG14 and SG15 of the routine of FIG. 25.

Figure 25:
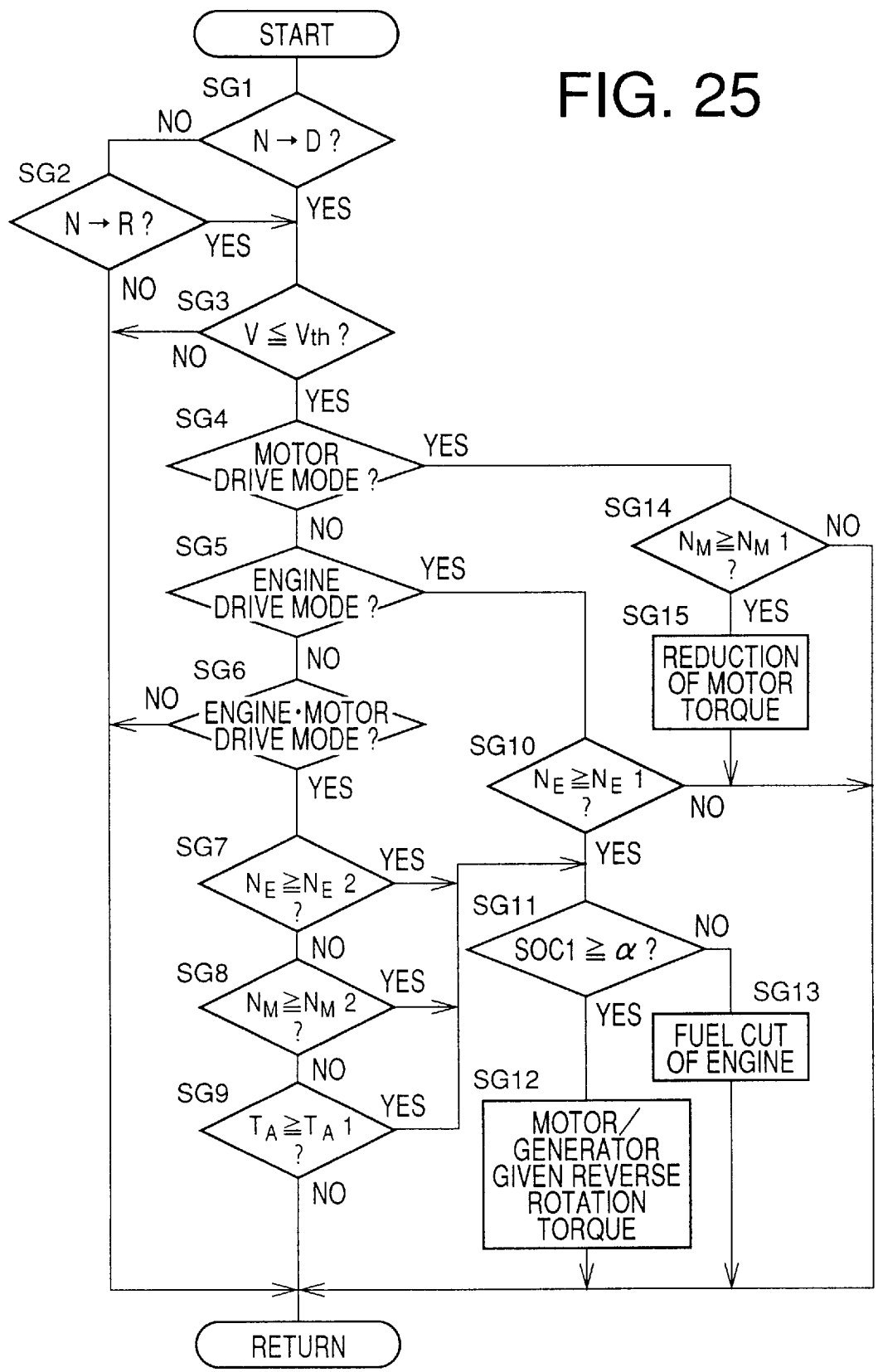
FIG. 25 is a flow chart illustrating a routine for controlling the motor/generator of the hybrid drive system of FIG. 23, when the shift lever is operated to a drive position.

The routine of FIG. 25 is initiated with step SG1 to determine whether the shift lever 42 has been operated from the neutral position "N" to the drive position "D". If a negative decision (NO) is obtained in step SG1, the control flow goes to step SG2 to determine whether the shift lever 42 has been operated from the neutral position "N" to the reverse position "R". If an affirmative decision (YES) is obtained in step SG1 or SG2, the control flow goes to step SG3 to determine whether the vehicle speed V is equal to or lower than a predetermined threshold $V_{th}$. If an affirmative decision (YES) is obtained in step SG3, the control flow goes to step SG4 and the following steps. The threshold $V_{th}$ is a lower limit below which the vehicle is considered to be stopped or running at a speed that is low enough to cause a shifting shock or an overload of the automatic transmission 204 due to an inertia of the drive power source. For instance, the threshold $V_{th}$ is selected within a range of about 5–10 km/h.

Step SG4 is provided to determine whether the MOTOR DRIVE mode (operation mode 1) is established. If an affirmative decision (YES) is obtained in step SG4, the control flow goes to step SG14 to determine whether the motor speed $N_M$ is equal to or higher than a predetermined threshold $N_{M1}$. This threshold $N_{M1}$ is an upper limit above which the automatic transmission 204 is likely to have a shifting shock or an overload due to the inertia of the motor/generator 14 upon reduction of the motor speed NM. Different values may be used as the threshold $N_{M1}$ for the drive position "D" and the reverse position "R" which have different speed ratios (FIG. 3). In this case, the threshold value $N_{M1}$ for the reverse position "R" having a higher speed ratio is smaller than that for the drive position "D". If an affirmative decision (YES) is obtained in step SG14, the control flow goes to step SG14 in which the motor torque $T_M$ is reduced to reduce the motor speed $N_M$, for reducing the shifting shock and overload of the automatic transmission 204 upon transmission of power thereto when the shift lever 42 is operated to the drive or reverse position "D", "R". The amount of reduction of the motor torque $T_M$ is determined depending upon the motor speed $N_M$, with the inertia of the motor/generator 14 being taken into account. The reduction of the motor torque $T_M$ is effected prior to the engaging actions of the clutches 216, 220, 222 of the automatic transmission 204 and/or the engaging action of the second clutch CE2.

If a negative decision (NO) is obtained in step SG4, the control flow goes to step SG5 to determine whether the ENGINE DRIVE mode (operation mode 2) is established. If an affirmative decision (YES) is obtained in step SG5, the control flow goes to step SE10 to determine whether the engine speed $N_E$ is equal to or higher than a predetermined threshold $N_{E1}$. This threshold $N_{E1}$ is an upper limit above which the automatic transmission 204 is likely to have a shifting shock or an overload due to an inertia of the engine 12 upon reduction of the engine speed $N_E$. For instance, the threshold $N_{E1}$ is determined to be about 3500 r.p.m. upon operation of the shift lever 42 from the neutral position "N" to the drive position "D", and about 2500 r.p.m. upon operation of the shift lever 42 from the neutral position "N" to the reverse position "R" whose speed ratio is higher than the drive position "D". If an affirmative decision (YES) is obtained in step SG10, the control flow goes to step SG11 to determine whether the stored electric energy amount SOC1 of the storage device 58 is equal to or larger than a predetermined threshold α. For instance, this determination is effected by determining whether the stored electric energy amount SOC1 is equal to or larger than the lower limit A used in steps S12, S16 and S18 of the routine of FIG. 8. If an affirmative decision (YES) is obtained in step SG11, the control flow goes to step SG12 in which the motor/generator 14 is given the torque $T_M$ for rotation in the reverse direction. As a result, the engine speed $N_E$ is reduced, for reducing the shifting shock and overload of the automatic transmission 204 upon transmission of power thereto when the shift lever 42 is operated to the drive or reverse position "D", "R". The reverse rotation motor torque $T_M$ is determined depending upon the engine speed $N_E$, with the inertia of the engine 12 being taken into account. This control of the motor torque $T_M$ is effected after the engaging actions of the clutches CE1 and CE2 and prior to the engaging actions of the clutches 216, 220, 222 of the automatic transmission 204. It is possible to reduce the engine speed $N_E$ by controlling the motor/generator 14 so as to produce a regenerative braking torque $T_M$, rather than the reverse rotation torque $T_M$.

If the stored electric energy amount SOC1 is smaller than the threshold a, that is, if a negative decision (NO) is obtained in step SE11, the control flow goes to step SG13 in which the fuel cut of the engine 12 is effected to reduce the shifting shock of the automatic transmission 204.

If a negative decision (NO) is obtained in step SG5, that is, if the ENGINE DRIVE mode is not established, step SG6 is implemented to determine whether the ENGINE≦MOTOR DRIVE mode (operation mode 4) is established.

If an affirmative decision (YES) is obtained in step SG6, the control flow goes to step SG7 to determine whether the engine speed $N_E$ is equal to or higher than a predetermined threshold $N_{E2}$. This threshold $N_{E2}$ is an upper limit above which the automatic transmission 204 is likely to have a shifting shock or an overload due to the inertia of the engine 12 upon reduction of the engine speed $N_E$. For instance, the threshold $N_{E2}$ is determined to be about 3000 r.p.m. for the drive position "D", and about 2000 r.p.m. for the reverse position "R", with the inertia of the motor/generator 14 being also taken into account. If an affirmative decision (YES) is obtained in step SG7, the control flow goes to step SG11 and the following steps described above. In this case, however, step SG12 may be modified to reduce the motor torque $T_M$, as in step SG15, for reducing the motor speed $N_M$ and the engine speed $N_E$. The amount of the reverse rotation motor torque $T_M$ or the amount of reduction of the motor torque $T_M$ is determined depending upon the speeds $N_E$, $N_M$, with the inertia values of the engine 12 and the motor/generator 14 being both taken into account.

If a negative decision (NO) is obtained in step SG7, the control flow goes to step SG8 to determine whether the motor speed $N_M$ is equal to or higher than a predetermined threshold $N_{M2}$. This threshold $N_{M2}$ is an upper limit above which the automatic transmission 204 is likely to have a shifting shock or an overload due to the inertia of the motor/generator 14 upon reduction of the motor speed $N_M$. The threshold $N_{M2}$ is determined to be smaller than the threshold $N_{M1}$, with the inertia of the engine 12 being also taken into account. Different values may be used as the threshold $N_{M2}$, for the drive and reverse positions "N", "R" having the different speed ratios. If an affirmative decision (YES) is obtained in step SG8, the control flow goes to step SG11 and the following steps. If a negative decision (NO) is obtained in step SG8, the control flow goes ato step SG9 to determine whether a total torque $T_A$ which is a sum of the engine torque $T_E$ and the motor torque $T_M$ is equal to or larger than a predetermined threshold $T_{A1}$. This threshold $T_{A1}$ is an upper limit above which the automatic transmission 204 is likely to have a shifting shock or an overload due to the inertia of the engine 12 and the motor/generator 14 upon reduction of the engine and motor speeds $N_E$, $N_M$. Different values may be used as the threshold $T_{A1}$, for the drive and reverse positions "D", "R".

In the present hybrid drive system 200, the motor/generator 14 is controlled so as to reduce the motor speed $N_M$ and/or the engine speed $N_E$ if the motor speed $N_M$ and/or the engine speed $N_E$ is/are not lower than the predetermined threshold value or values, upon operation of the shift lever 42 from the neutral position "N" to the drive position "D" or reverse position "R". Accordingly, the inertia of the motor/generator 14 and/or the engine 12 is reduced, for reducing the shifting shock or overload of the automatic transmission 204 upon transmission of power from the drive power source to the drive wheels through the automatic transmission 204. Since the motor speed $N_M$ and/or the engine speed $N_E$ is/are positively reduced with the inertia taken into account, the inertia torque is reduced with higher reliability and stability to reduce the shifting shock, than where the fuel supply to the engine 12 is cut.

Figure 26:
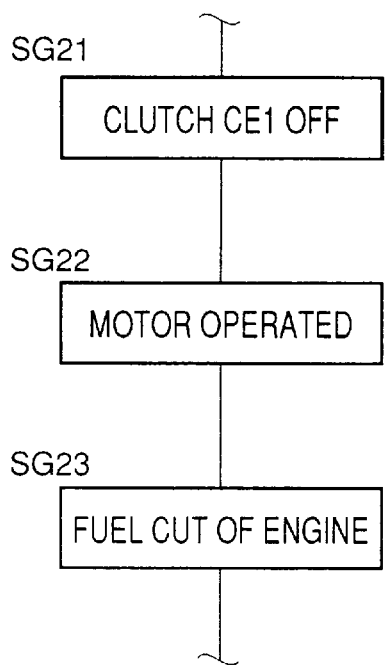
FIG. 26 is a flow chart illustrating a fifth embodiment of the invention.

FIG. 26 illustrated a modification of the routine of FIG. 25 according to a sixth embodiment of the invention. In this embodiment of FIG. 26, steps SG21–SG23 are substituted for steps SG11–SG13 of FIG. 25. In step SG21, the clutch CE1 is released to disconnect the engine 12 and the automatic transmission 204. It will be understood that a portion of the controller assigned to implement step SG21 constitutes input restricting means for restricting a power transfer from the drive power source in the form of the engine 12 to the power transmitting device in the form of the automatic transmission 204 if the operating speed of the drive power source is higher than a predetermined threshold, when the shift lever 42 is operated from the non-drive state to the drive state. The clutch CE1 is released before the engaging actions of the clutches 216, 220, 222 of the automatic transmission 204 upon operation of the shift lever 42 to the drive or reverse position "D", "R". Step SG21 is followed by step SG22 in which the motor/generator 14 is operated to provide a suitable torque $T_M$ for driving the vehicle in the forward or rearward direction. Then, step SG23 is implemented to effect the fuel cut of the engine 12 for gradually reducing the engine speed $N_E$.

In the present sixth embodiment of FIG. 26, the power transmitting path between the engine 12 as the drive power source and the automatic transmission 204 as the power transmitting device is disconnected by releasing of the clutch CE1, so that the automatic transmission 204 is protected from the inertia of the engine 12 upon engaging actions of the clutches 216, 220, 222, which would cause a shifting shock or an overload.

Figure 27:
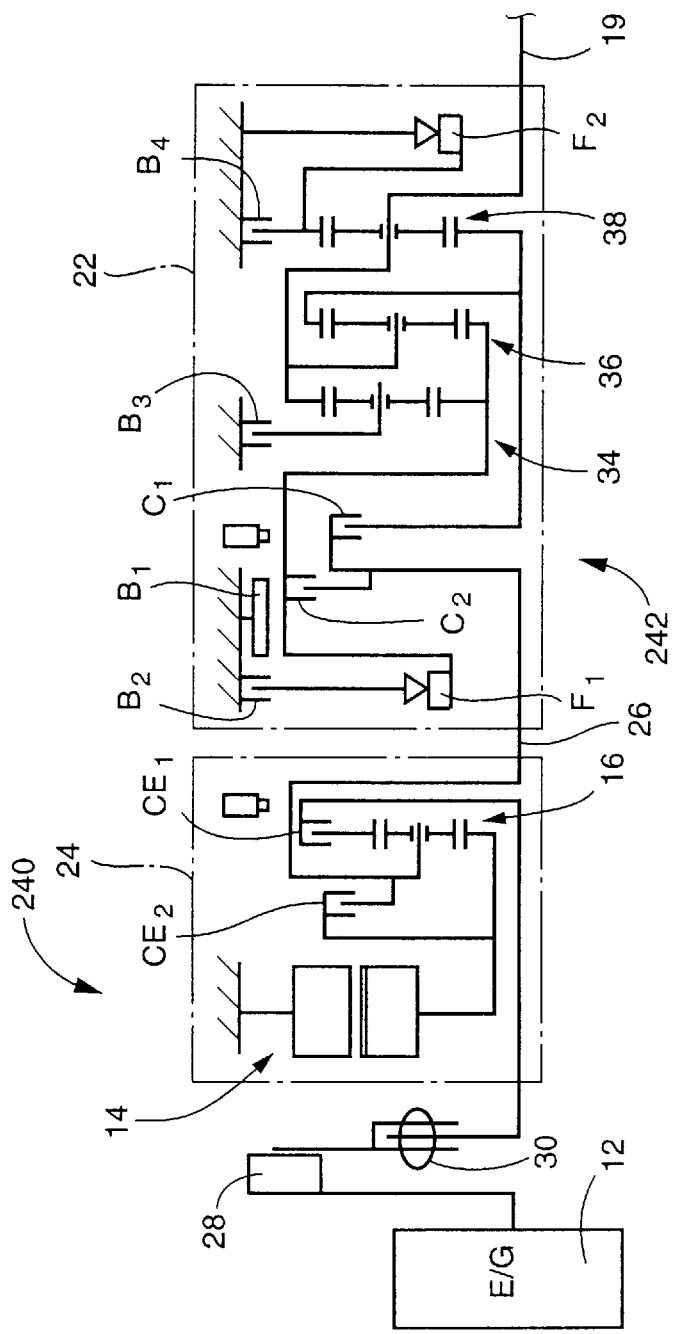
FIG. 27 is a schematic view showing a general arrangement of a hybrid drive system according to a sixth embodiment of the invention.

While the hybrid drive system 10 of FIG. 1 uses the automatic transmission 18 having one reverse-drive position and five forward-drive positions, the principle of the present invention is equally applicable to a hybrid drive system 240 using an automatic transmission 242 which does not include the auxiliary transmission 20 and employs only the primary transmission 22, as shown in FIG. 27. This automatic transmission 242 has one reverse-drive position and four forward-drive positions, as indicated in FIG. 28.

While the present invention has been described above in its presently preferred embodiments by reference to the accompanying drawings, it is to be understood that the invention may be otherwise embodied.

In the illustrated embodiments, step S7 of the operation mode determining sub-routine of FIG. 8 is formulated to determine whether the shift lever 42 is placed in the non-drive state or position (neutral or parking position "N", "P"), step S7 may be formulated to determine whether the accelerator pedal is in a depressed state, more specifically, whether the operating amount $\theta_{AC}$ of the accelerator pedal is larger than a predetermined lower limit which is close to zero but larger than zero.

It is to be understood that the present invention may be embodied with various other changes, modifications and improvements, which may occur to those skilled in the art, in the light of the foregoing teaching.

What is claimed is:

1. A power transmitting system for a motor vehicle, comprising:
   a drive power source for driving the motor vehicle;
   first power disconnecting means for electrically disconnecting a power transmitting path between said drive power source and a drive wheel of the motor vehicle;
   manually operated selecting means for selecting one of a plurality of operating states of the power transmitting system, said operating states including a neutral state; and
   second power disconnecting means responsive to an operation of said manually operated selecting means to said neutral state, for mechanically disconnecting said power transmitting path.

2. A power transmitting system according to claim 1, further comprising an automatic transmission having a plurality of operating positions, and wherein said second power disconnecting means includes:
   hydraulically operated clutch means having a connecting state and a disconnecting state for connecting and disconnecting said power transmitting path, respectively;
   a manual shift valve for shifting said automatic transmission in response to an operation of said manually operated selecting means; and
   a linkage for mechanically connecting said manually operated selecting means and said manual shift valve such that said manual shift valve is moved to a position for establishing said disconnecting state of said hydraulically operated clutch means when said manually operated selecting means is operated to said neutral state to place said automatic transmission in a neutral state.

3. A power transmitting system according to claim 1, wherein said drive power source includes an engine and an electric motor, said power transmitting system further comprising an electrically controlled torque converter which includes said electric motor and a planetary gear mechanism, said first power disconnecting means including clutches incorporated in said torque converter, for disconnecting said power transmitting path between said drive power source and said drive wheels when said manually operated selecting means is operated to said neutral state.

4. A power transmitting system according to claim 1, wherein said first power disconnecting means is operated to electrically disconnect said power transmitting path when said manually operated selecting means is operated to said neutral state.

5. A power transmitting system according to claim 1, wherein said power drive source includes an engine and an electric motor, and wherein said first power disconnecting means includes means for establishing an electrically neutral state of the power transmitting system in which said electric motor is in a non-load condition with a rotor shaft thereof being freely rotatable, to electrically disconnect said power transmitting path.

6. A power transmitting system for a motor vehicle, comprising:
   an engine operated by combustion of a fuel;
   a motor/generator having a function of at least one of an electric motor and an electric generator, said motor/generator having a rotor shaft;
   a synthesizing/distributing mechanism for mechanically synthesizing and distributing forces, said synthesizing/distributing mechanism having a first rotary element connected to said engine, a second rotary element connected to said motor/generator, a third rotary element, and an output member from which an output of said synthesizing/distributing mechanism is produced;
   first power disconnecting means for placing said motor/generator in a non-load condition in which said rotor shaft is freely rotatable, to thereby electrically disconnect a power transmitting path between said engine and said output member;
   manually operated selecting means for selecting one of a plurality of operating states of the power transmission system, said operating states including a neutral state; and
   second power disconnecting means responsive to an operation of said manually operated selecting means to said neutral state, for mechanically disconnecting said power transmitting path.

7. A power transmitting system according to claim 6, wherein said first power disconnecting means includes a first clutch for connecting said engine and said first rotary element, and a second clutch for connecting two elements of said first, second and third rotary elements, for rotating said synthesizing/distributing mechanism as a unit, said first power disconnecting means engaging said first clutch and releasing said second clutch, and placing said motor/generator in said non-load condition, to thereby place said motor/generator in an electrically neutral state.

8. A power transmitting system according to claim 7, further comprising a hybrid drive controller for releasing said first clutch and engaging said second clutch, to thereby establish a motor drive mode in which said motor/generator is operated as the drive power source for running the motor vehicle, said hybrid drive controller engaging said first and second clutches while placing said motor/generator in said non-load condition, to thereby establish an engine drive mode in which said engine is operated as the drive power source for running the motor vehicle.

9. A power transmitting system according to claim 6, wherein said synthesizing/distributing mechanism includes a planetary gear mechanism having a ring gear as said first rotary element, a sun gear as said secondary rotary element, and a carrier as said third rotary element.

10. A hybrid drive system for a motor vehicle, comprising:
an engine operated by combustion of a fuel;
a motor/generator;
a synthesizing/distributing mechanism for mechanically synthesizing and distributing forces, said synthesizing/distributing mechanism having a first rotary member connected to said engine, a second rotary member connected to said motor/generator, a third rotary element, and an output member from which an output of said synthesizing/distributing mechanism is produced;
manually operated selecting means for selecting one of a non-drive state and a drive state;
electrically neutralizing means responsive to an operation of said manually operated selecting means to said non-drive state, for establishing an electrically neutral state of the hybrid drive system in which said motor/generator is in a non-load condition with said second rotary element being freely rotatable, to electrically disconnect a power transmitting path between said engine and said output member; and
start-up control means responsive to an operation of said selecting means from said non-drive state to said drive state, for increasing a reaction torque of said motor/generator from zero, to thereby transmit power from said engine to said output member, said start-up control means controlling the reaction torque of said motor/generator to rise according to one of a plurality of predetermined different rise characteristics which is selected depending upon a running condition of the motor vehicle.

11. A hybrid drive system according to claim 10, wherein said start-up control means controls the reaction torque of the motor/generator to rise at a lower rate when a speed of said engine or said motor/generator is higher than a predetermined threshold, than when the speed of said engine or said motor/generator is not higher than said threshold.

12. A hybrid drive system according to claim 10, wherein said start-up control means inhibits a rise of said reaction torque of the motor/generator while a speed of said engine or said motor/generator is higher than a predetermined threshold.

13. A hybrid drive system according to claim 10, wherein said start-up control means controls said reaction torque of the motor/generator such that an amount of rise of said reaction torque is smaller when a speed of said engine or said motor/generator is higher than a predetermined threshold than when the speed of said engine or said motor/generator is not higher than said threshold.

14. A hybrid drive system according to claim 10, wherein said drive state selectable by said manually operated selecting means includes a forward drive state and a reverse drive state, and said start-up control means selects said one of the plurality of predetermined different rise characteristics, depending upon whether said manually operated selecting means is operated from said non-drive state to said forward drive state or to said reverse drive state, said hybrid drive system further comprising power transmitting device disposed between said synthesizing/distributing mechanism and a drive wheel of the motor vehicle, said power transmitting device having a non-drive state which is established to disconnect a power transmitting path between said engine and said drive wheel when said selecting means is operated to said non-drive state, a forward drive state which is established to drive the motor vehicle in a forward direction when said selecting means is operated to said forward drive state, and a reverse drive state which is established to drive the motor vehicle in a reverse direction when said selecting means is operated to said reverse drive state.

15. A hybrid drive system according to claim 10, further comprising drive mode selecting means for selecting one of a plurality of vehicle drive modes including a low friction coefficient road drive mode in which the vehicle vehicle is run on a road surface whose friction coefficient is lower than a predetermined threshold, and wherein said start-up control means controls said reaction torque of said motor/generator such that an amount of rise of said reaction torque is smaller when said low friction coefficient road drive mode is selected by said drive mode selecting means, than when said low friction coefficient road drive mode is not selected.

16. A hybrid drive system according to claim 10, wherein said start-up control means controls said reaction torque of said motor/generator in a feedback fashion such that a physical value which changes in relation to said reaction torque coincides with a predetermined target value.

17. A hybrid drive system according to claim 10, wherein said start-up control means controls said reaction torque of said motor/generator so as to coincide with a target value which is updated by learning compensation on the basis of a result of control of the reaction torque by said start-up control means.

18. A hybrid drive system for a motor vehicle, comprising:
a drive power source for driving the motor vehicle, said drive power source including an engine operated by combustion of a fuel, and a motor/generator;
manually operated selecting means for selecting one of a non-drive state and a drive state;
power transmitting device disposed between said drive power source and a drive wheel of the motor vehicle, said power transmitting device having a non-drive state which is established to disconnect a power transmitting path between said engine and.said drive wheel when said selecting means is operated to said non-drive state, and a drive state which is established to drive the motor vehicle when said selecting means is operated to said drive state; and
vehicle drive motor control means responsive to an operation of said manually operated selecting means, for controlling said motor/generator so as to reduce an input speed of said power transmitting device, when said input speed is expected to be higher than a predetermined threshold if said motor/generator is not controlled by said vehicle drive motor control means.

19. A hybrid drive system according to claim 18, wherein said vehicle drive motor control means reduces a torque of said motor/generator when power is transmitted to said power transmitting device on the basis of an output of said motor/generator.

20. A hybrid drive system for a motor vehicle, including:
a drive power source for driving the motor vehicle, said drive power source including an engine operated by combustion of a fuel, and a motor/generator;
manually operated selecting means for selecting one of a non-drive state and a drive state;
power transmitting device disposed between said drive power source and a drive wheel of the motor vehicle, said power transmitting device having a non-drive state which is established to disconnect a power transmitting path between said engine and said drive wheel when said selecting means is operated to said non-drive state, and a drive state which is established to drive the motor vehicle when said selecting means is operated to said drive state; and input restricting means responsive to an operation of said manually operated selecting means, for restricting transmission of power between said drive power source and said power transmitting device, when said input speed is expected to be higher than a predetermined threshold if said said transmission of power is not restricted by said input restricting means.

* * * * *